US010011256B2

(12) United States Patent
Isono

(10) Patent No.: US 10,011,256 B2
(45) Date of Patent: *Jul. 3, 2018

(54) MASTER CYLINDER APPARATUS

(71) Applicant: TOYOTA JIDOSHA KABUSHIKI KAISHA, Toyota-shi, Aichi-ken (JP)

(72) Inventor: Hiroshi Isono, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 531 days.

This patent is subject to a terminal disclaimer.

(21) Appl. No.: 14/420,497

(22) PCT Filed: Oct. 17, 2013

(86) PCT No.: PCT/IB2013/002318
§ 371 (c)(1),
(2) Date: Feb. 9, 2015

(87) PCT Pub. No.: WO2014/072779
PCT Pub. Date: May 15, 2014

(65) Prior Publication Data
US 2015/0197228 A1    Jul. 16, 2015

(30) Foreign Application Priority Data

Nov. 8, 2012  (JP) ................................ 2012-246366

(51) Int. Cl.
*B60T 13/68* (2006.01)
*B60T 11/224* (2006.01)
(Continued)

(52) U.S. Cl.
CPC ............... *B60T 13/68* (2013.01); *B60T 7/04* (2013.01); *B60T 8/4077* (2013.01);
(Continued)

(58) Field of Classification Search
CPC ..... B60T 8/4077; B60T 11/224; B60T 13/686
See application file for complete search history.

(56) References Cited

U.S. PATENT DOCUMENTS

| 8,801,112 B2 | 8/2014 | Ishida |
| 2002/0008426 A1 | 1/2002 | Isono |

(Continued)

FOREIGN PATENT DOCUMENTS

| CN | 102099231 A | 6/2011 |
| DE | 102009033499 A1 | 1/2010 |

(Continued)

OTHER PUBLICATIONS

Aug. 13, 2014 Search Report issued in International Application PCT/IB2013/002318.

(Continued)

*Primary Examiner* — F. Daniel Lopez
(74) *Attorney, Agent, or Firm* — Oliff PLC

(57) ABSTRACT

A master cylinder apparatus includes: an input piston that can be moved forward by operating a brake operating member; a pressure piston that is provided in front of the input piston to be capable of moving relative to the input piston; and a stroke velocity ratio modification device that is capable of modifying a stroke velocity ratio, which is a ratio between a stroke velocity of the pressure piston and a stroke velocity of the input piston, in at least two stages while the input piston moves from a rear end portion position to a front end portion position, and that sets the stroke velocity ratio at 1 when an abnormality occurs—in the master cylinder apparatus.

11 Claims, 16 Drawing Sheets

(51) Int. Cl.
    *B60T 13/14*     (2006.01)
    *B60T 13/66*     (2006.01)
    *B60T 7/04*     (2006.01)
    *B60T 8/40*     (2006.01)

(52) U.S. Cl.
    CPC ........... *B60T 11/224* (2013.01); *B60T 13/145* (2013.01); *B60T 13/662* (2013.01); *B60T 13/686* (2013.01)

(56) References Cited

U.S. PATENT DOCUMENTS

| | | |
|---|---|---|
| 2002/0124563 A1 | 9/2002 | Ogiwara et al. |
| 2011/0115282 A1 | 5/2011 | Dinkel et al. |
| 2011/0259004 A1 | 10/2011 | Bae et al. |
| 2011/0285199 A1 | 11/2011 | Ishida |
| 2012/0324883 A1 | 12/2012 | Isono |
| 2015/0251643 A1* | 9/2015 | Isono ..................... B60T 7/042 60/588 |

FOREIGN PATENT DOCUMENTS

| | | |
|---|---|---|
| DE | 102011085986 A1 | 7/2012 |
| JP | 2002-127891 A | 5/2002 |
| JP | 2002-321609 A | 11/2002 |
| JP | 2007-196824 A | 8/2007 |
| JP | 2008-024098 A | 2/2008 |
| JP | 2012-001069 A | 1/2012 |
| WO | 2013/175556 A1 | 11/2013 |

OTHER PUBLICATIONS

Jun. 5, 2017 Office Action issued in U.S. Appl. No. 14/423,156.
Sep. 22, 2017 Notice of Allowance issued in U.S. Appl. No. 14/423,156.

* cited by examiner

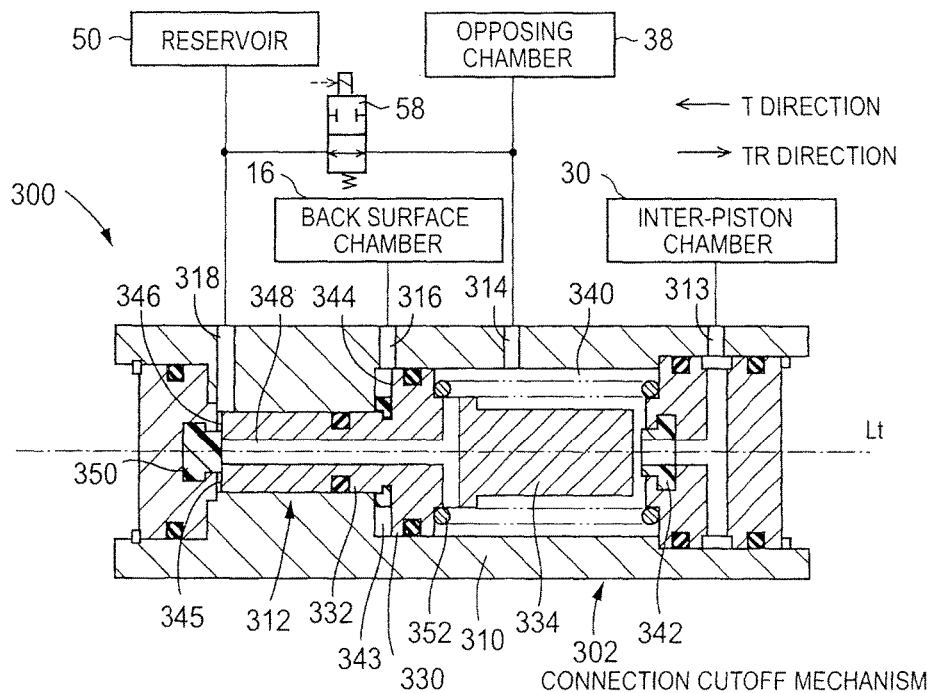

| | RESERVOIR CONNECTION VALVE | POSITION OF MOVABLE MEMBER | CONNECTION CUTOFF CONDITION |
|---|---|---|---|
| NON-BRAKE OPERATION CONDITION | Open | INTER-CHAMBER CONNECTION POSITION | OPPOSING CHAMBER AND INTER-PISTON CHAMBER COMMUNICATE VIA COMMUNICATION CHAMBER AND COMMUNICATE WITH RESERVOIR VIA RESERVOIR CONNECTION VALVE |
| INITIAL STAGE OF BRAKE OPERATION | Shut | INTER-CHAMBER CONNECTION POSITION | OPPOSING CHAMBER AND INTER-PISTON CHAMBER COMMUNICATE VIA COMMUNICATION CHAMBER, CUT OFF FROM RESERVOIR |
| NORMAL USE REGION | Shut | INTER-CHAMBER CUTOFF POSITION | INTER-PISTON CHAMBER CUT OFF FROM COMMUNICATION CHAMBER, RESERVOIR COMMUNICATES WITH COMMUNICATION CHAMBER |
| ABNORMALITY IN ELECTRICAL SYSTEM | Open | INTER-CHAMBER CONNECTION POSITION | OPPOSING CHAMBER AND INTER-PISTON CHAMBER COMMUNICATE VIA COMMUNICATION CHAMBER AND COMMUNICATE WITH RESERVOIR VIA RESERVOIR CONNECTION VALVE |

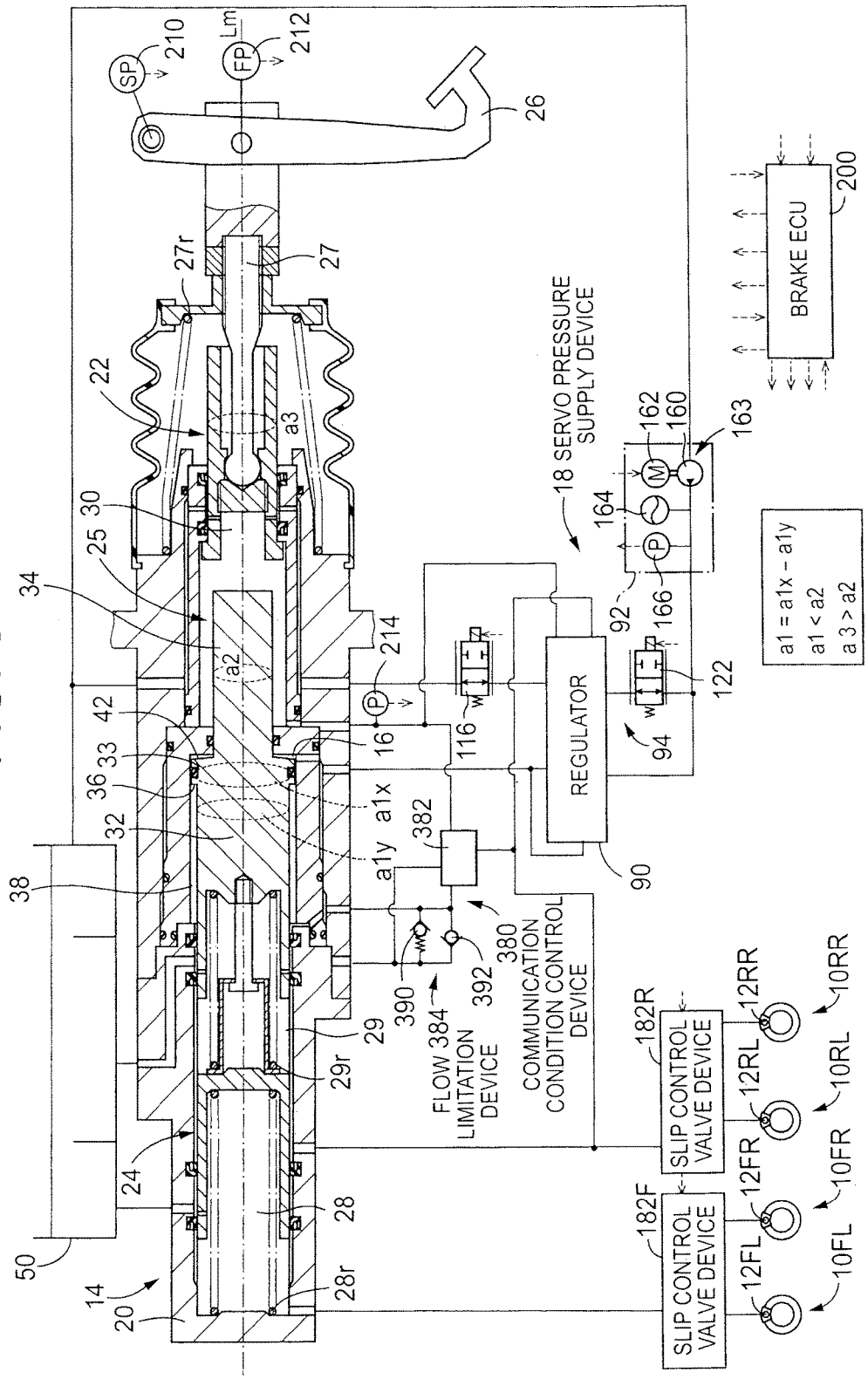

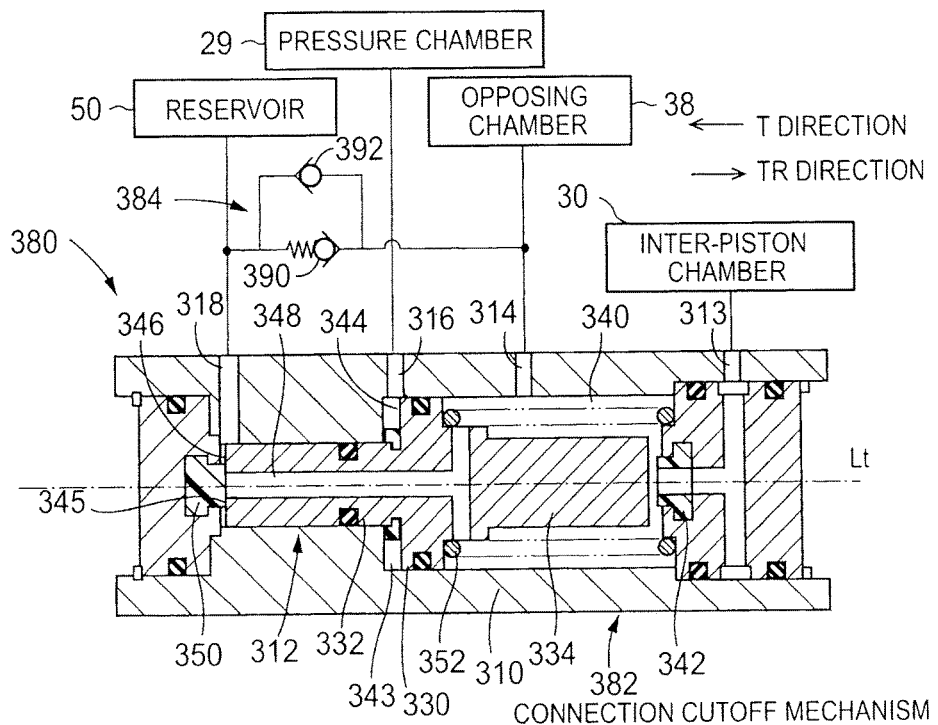

| | POSITION OF SPOOL | COMMUNICATION CONDITION |
|---|---|---|
| NON-BRAKE OPERATION CONDITION | INTER-CHAMBER CONNECTION POSITION | OPPOSING CHAMBER AND INTER-PISTON CHAMBER COMMUNICATE VIA COMMUNICATION CHAMBER, SUBSTANTIALLY COMMUNICATE WITH RESERVOIR |
| INITIAL STAGE OF BRAKE OPERATION | INTER-CHAMBER CONNECTION POSITION | OPPOSING CHAMBER AND INTER-PISTON CHAMBER COMMUNICATE VIA COMMUNICATION CHAMBER, SUBSTANTIALLY CUT OFF FROM RESERVOIR |
| NORMAL USE REGION | INTER-CHAMBER CUTOFF POSITION | INTER-PISTON CHAMBER CUT OFF FROM COMMUNICATION CHAMBER, RESERVOIR COMMUNICATES WITH COMMUNICATION CHAMBER |
| ABNORMALITY IN ELECTRICAL SYSTEM | INTER-CHAMBER CUTOFF POSITION | INTER-PISTON CHAMBER CUT OFF FROM COMMUNICATION CHAMBER, RESERVOIR COMMUNICATES WITH COMMUNICATION CHAMBER |

FIG. 11A

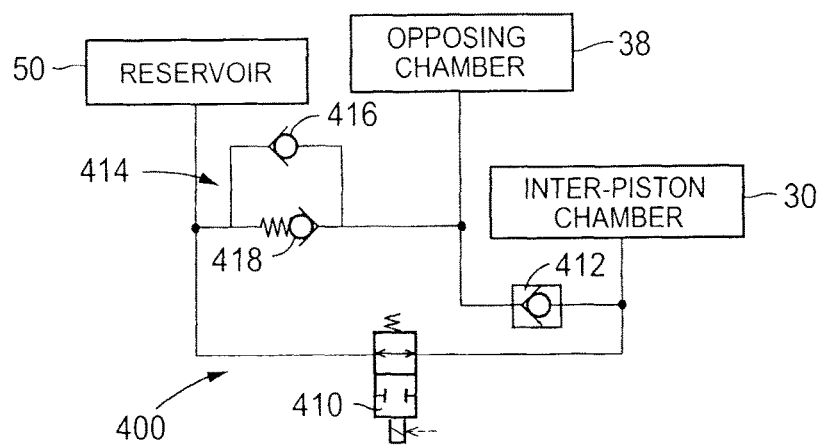

FIG. 11B

|  | RESERVOIR CONNECTION VALVE | COMMUNICATION CONDITION |
|---|---|---|
| NON-BRAKE OPERATION CONDITION | Open | OPPOSING CHAMBER AND INTER-PISTON CHAMBER COMMUNICATE WITH RESERVOIR |
| INITIAL STAGE OF BRAKE OPERATION | Shut | OPPOSING CHAMBER AND INTER-PISTON CHAMBER COMMUNICATE VIA COMMUNICATION VALVE, SUBSTANTIALLY CUT OFF FROM RESERVOIR |
| NORMAL USE REGION | Shut | OPPOSING CHAMBER CUT OFF FROM INTER-PISTON CHAMBER, OPPOSING CHAMBER SUBSTANTIALLY COMMUNICATES WITH RESERVOIR |
| ABNORMALITY IN ELECTRICAL SYSTEM | Open | OPPOSING CHAMBER AND INTER-PISTON CHAMBER COMMUNICATE WITH RESERVOIR |

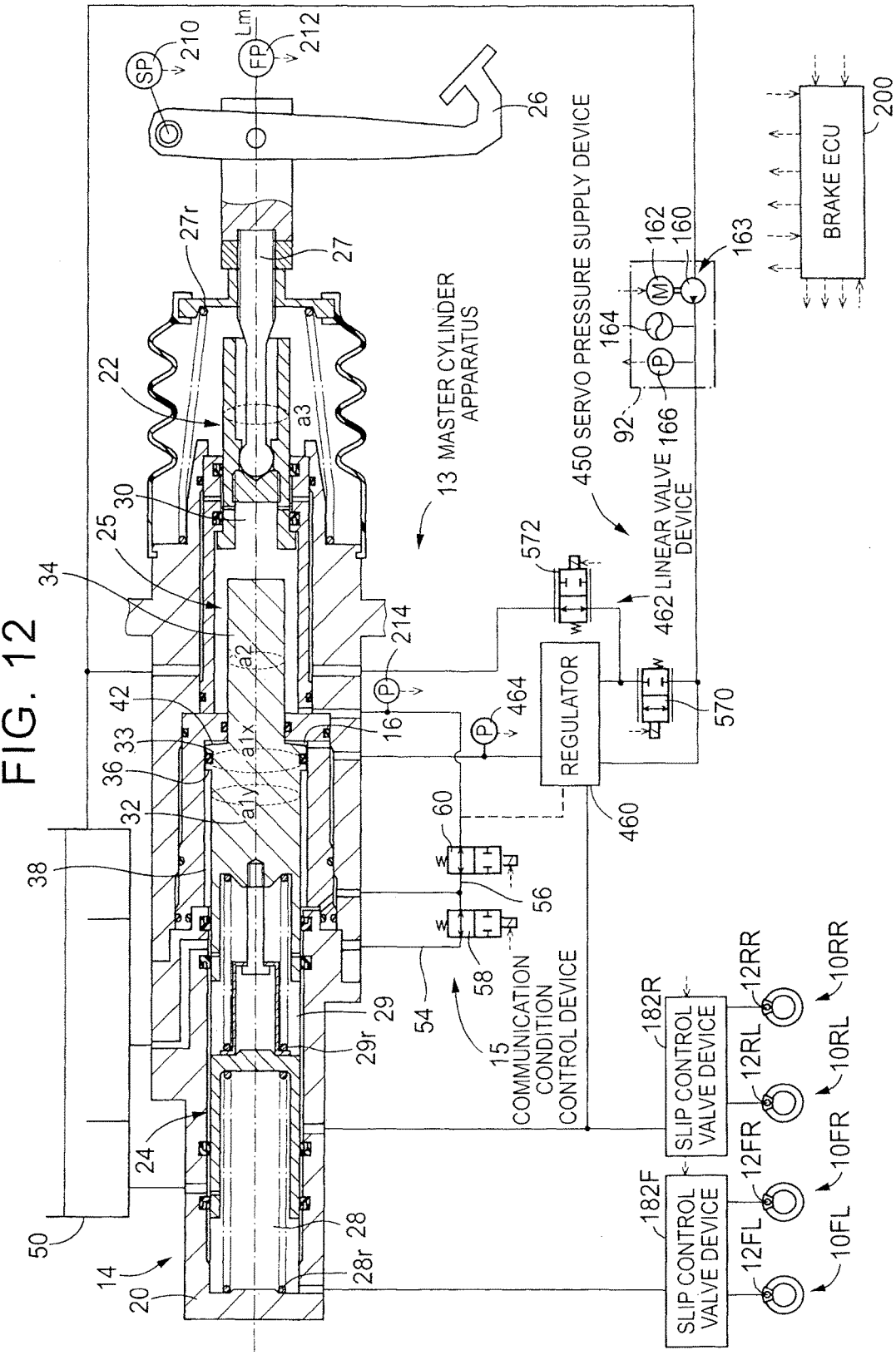

MASTER CYLINDER APPARATUS

BACKGROUND OF THE INVENTION

1. Field of the Invention

The invention relates to a master cylinder apparatus that has a master cylinder and is included in a hydraulic brake system.

2. Description of Related Art

Japanese Patent Application Publication No. 2008-24098 (JP 2008-24098 A) discloses a master cylinder apparatus. The master cylinder includes an input piston and a pressure piston, and the pressure piston can be caused to advance relative to the pressure piston by fluid pressure from a rearward back surface chamber.

SUMMARY OF THE INVENTION

The present invention provides an improved master cylinder apparatus having a master cylinder that includes an input piston and a pressure piston. According to the invention, a brake operating member operated by a driver, for example, is improved in operability.

A master cylinder apparatus according to a first aspect of the invention includes: an input piston that is configured to move forward by operating a brake operating member; a pressure piston that is provided in front of the input piston configured to move relative to the input piston; and a stroke velocity ratio modification device that is configured to modify a stroke velocity ratio, which is a ratio between a stroke velocity of the pressure piston and a stroke velocity of the input piston, in at least two stages while the input piston moves from a rear end portion position to a front end portion position, and that sets the stroke velocity ratio at 1 when an abnormality occurs in the master cylinder apparatus.

In the aspect described above, the stroke velocity ratio modification device may be configured to modify the stroke velocity ratio in the at least two stages when the stroke velocity ratio equals or exceeds 1.

In the aspect described above, the stroke velocity ratio modification device may include a normal use region velocity ratio reduction unit that sets the stroke velocity ratio small when a stroke of the input piston is large, compared to the stroke velocity ratio when the stroke of the input piston is small. In an initial stage of a brake operation, the stroke velocity ratio is increased, and therefore an initial response delay in the brake can be suppressed favorably.

In the aspect described above, the input piston may be disposed opposite the pressure piston via an inter-piston chamber, the pressure piston may include a large diameter portion, and a front small diameter portion that is provided in front of the large diameter portion, and has a smaller diameter than the large diameter portion, and a surface area of the large diameter portion of the pressure piston on which pressure is received from a front side may be equal to or smaller than a surface area on which pressure is received from the inter-piston chamber side. When the pressure piston is caused to advance by fluid pressure in a back surface chamber in a condition where the opposing chamber is connected to the inter-piston chamber but cut off from a reservoir, working fluid is supplied from the opposing chamber into the inter-piston chamber. When, in this case, an effective pressure receiving surface area $a1$ of a part of the pressure piston that receives fluid pressure from the opposing chamber is identical to an effective pressure receiving surface area $a2$ of a part of the pressure piston that receives fluid pressure from the inter-piston chamber ($a1=a2$), theoretically the input piston is not caused to advance. As a result, the stroke velocity ratio takes an extremely large value, or in other words is theoretically infinite. When the effective pressure receiving surface area $a2$ of the part of the pressure piston that receives fluid pressure from the inter-piston chamber is larger ($a2>a1$), on the other hand, advancement of the input piston is permitted, and therefore the stroke velocity ratio takes a finite large value. In both cases, the stroke velocity ratio increases in an initial stage of a brake operation, and therefore an initial response delay in a brake can be suppressed favorably. Note that the effective pressure receiving surface area is the surface area of a part that actually receives fluid pressure, and takes a value ($q/s$) obtained by dividing volumetric change $q$ in a space inside the inter-piston chamber (the opposing chamber) capable of housing working fluid when the input piston (the pressure piston) moves by a set stroke $s$ by the set stroke.

In the aspect described above, the input piston may be disposed opposite the pressure piston via the inter-piston chamber, and a surface area on which the input piston receives pressure from the inter-piston chamber may equal or exceed the surface area on which the pressure piston receives pressure from the inter-piston chamber. When an effective pressure receiving surface area $a3$ of a part of the input piston that receives fluid pressure from the inter-piston chamber is larger than the effective pressure receiving surface area $a2$ of the part of the pressure piston that receives fluid pressure from the inter-piston chamber ($a3>a2$) and the inter-piston chamber is cut off from both the reservoir and the opposing chamber, a stroke velocity ratio (vout/vin) takes an inverse ($a3/a2$) of the effective pressure receiving surface area ratio, and therefore the stroke velocity ratio is 1 or more. Note that the effective pressure receiving surface area $a3$ of the part of the input piston that receives the fluid pressure of the inter-piston chamber may be set to be smaller than the effective pressure receiving surface area $a2$ of the part of the pressure piston that receives the fluid pressure of the inter-piston chamber ($a3<a2$). In this case, the stroke velocity ratio takes a smaller value than 1.

In the aspect described above, the input piston may be disposed opposite the pressure piston via the inter-piston chamber, the pressure piston may include the large diameter portion, the front small diameter portion that is provided in front of the large diameter portion and has a smaller diameter than the large diameter portion, and the step constituted by the large diameter portion and the front small diameter portion, and the surface constituting the step between the large diameter portion and the front small diameter portion of the pressure piston may form an opposing chamber. Moreover, the master cylinder apparatus may further include a communication condition control device provided between the inter-piston chamber, the opposing chamber, and a reservoir and may be configured to control communication conditions between the inter-piston chamber, the opposing chamber, and the reservoir so as to switch between an inter-chamber connection condition in which the opposing chamber and the inter-piston chamber communicate with each other but are cut off from the reservoir, an inter-chamber cutoff condition in which the opposing chamber is cut off from the inter-piston chamber, the inter-piston chamber is cut off from the reservoir, and the opposing chamber communicates with the reservoir, and a reservoir connection condition in which both the opposing chamber and the inter-piston chamber communicate with the reservoir. The communication condition control device may include one or more solenoid control valves or no solenoid control valves.

A stroke velocity ratio γa (vout/vin), which is a ratio between a stroke velocity vout of the pressure piston and a stroke velocity yin of the input piston in the inter-chamber connection condition of (i), is determined by the effective pressure receiving surface area a1 of the part of the pressure piston that receives fluid pressure from the opposing chamber, the effective pressure receiving surface area a2 of the part of the pressure piston that receives fluid pressure from the inter-piston chamber, and the effective pressure receiving surface area a3 of the part of the input piston that receives fluid pressure from the inter-piston chamber.

$$\gamma a = a3/(a2-a1)$$

A stroke velocity ratio γb in the inter-chamber cutoff condition of (ii) is determined by the effective pressure receiving surface area a3 of the part of the input piston that receives fluid pressure from the inter-piston chamber and the effective pressure receiving surface area a2 of the pressure piston.

$$\gamma b = a3/a2$$

In the reservoir connection condition of (iii), the input piston and the pressure piston are caused to advance integrally, and therefore a stroke velocity ratio γc is 1 (γc=1). The reservoir connection condition can be set when the master cylinder apparatus is inoperative or an abnormality occurs in an electrical system.

In the aspect described above, the communication condition control device may include: an inter-chamber connection cutoff valve constituted by a normally open solenoid valve provided between the opposing chamber and the inter-piston chamber; a reservoir connection valve constituted by a normally open solenoid valve provided between the opposing chamber and the reservoir; and a solenoid valve control unit that controls the communication conditions between the opposing chamber, the inter-piston chamber, and the reservoir by controlling the reservoir connection valve and the inter-chamber connection cutoff valve. The communication conditions between the opposing chamber, the inter-piston chamber, and the reservoir are controlled by controlling opening and closing of the reservoir connection valve and the inter-chamber connection cutoff valve. However, when an abnormality preventing solenoid valve control occurs, no current is supplied to the solenoids. As a result, the reservoir connection valve and the inter-chamber connection cutoff valve are opened such that the opposing chamber and the inter-piston chamber communicate with each other and with the reservoir.

In the aspect described above, the communication condition control device may include: a connection cutoff mechanism that is provided between the opposing chamber and the inter-piston chamber and reservoir and includes a movable member operated by a pilot pressure, a magnitude of which is determined through electric control, and configured to move between a communication position in which the opposing chamber and the inter-piston chamber communicate with each other but are cut off from the reservoir, and a cutoff position in which the opposing chamber communicates with the reservoir but the inter-piston chamber is cut off from both the opposing chamber and the reservoir; and a reservoir connection valve constituted by a normally open solenoid valve provided between the opposing chamber and the reservoir. In a case where the movable member of the connection cutoff mechanism is switched from the communication position to the cutoff position when the pilot pressure increases beyond a set pressure, the movable member is held in the communication position after an abnormality occurs in the electrical system such that the pilot pressure cannot be increased beyond the set pressure. Further, when an abnormality occurs in the electrical system, the reservoir connection valve opens. As a result, the opposing chamber and the inter-piston chamber communicate with each other and communicate with the reservoir via the reservoir connection valve.

A master cylinder apparatus according to a second aspect of the invention includes: an input piston that is configured to move forward by operating a brake operating member; and a pressure piston that is provided coaxially with the input piston and configured to move relative to the input piston, disposed opposite the input piston via an inter-piston chamber, and has a stepped shape including a large diameter portion and a front small diameter portion that has a smaller diameter than the large diameter portion and is provided in front of the large diameter portion, wherein a communication condition control device is provided between an opposing chamber, which is provided in front of a step surface between the large diameter portion and the front small diameter portion, the inter-piston chamber and a reservoir, the communication condition control device being configured to switch communication conditions among the opposing chamber, the inter-piston chamber, and the reservoir between at least a condition in which the opposing chamber and the inter-piston chamber communicate with each other but are cut off from the reservoir, a condition in which the opposing chamber is cut off from the inter-piston chamber, the opposing chamber communicates with the reservoir, and the inter-piston chamber is cut off from the reservoir, and a condition in which both the opposing chamber and the inter-piston chamber communicate with the reservoir.

In the aspect described above, the master cylinder apparatus may further include a back surface pressure control device having a power pressure source that is operated by a supply of power and is configured to output a fluid at a predetermined pressure, and a regulator that controls a pressure exerted on a back surface chamber, which is provided rearward of a pressure receiving surface of the pressure piston, to a magnitude corresponding to an operating condition of the brake operating member using the pressure output by the power pressure source. The pressure piston is caused to advance by fluid pressure in the back surface chamber, and therefore, by controlling the fluid pressure in the back surface chamber to a magnitude corresponding to the operating condition of the brake operating member, fluid pressure in a pressure chamber can also be controlled to a magnitude corresponding to the operating condition of the brake operating member. The operating condition of the brake operating member may be represented by at least one of an operating force applied to the brake operating member and an operating stroke thereof. Further, when an abnormality occurs in the electrical system, high-pressure fluid pressure can no longer be output from the power fluid pressure source to the regulator, and it is often, as a result, impossible to control the fluid pressure in the back surface chamber.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7A is a conceptual diagram (a partial sectional view) showing a communication cutoff control device of the hydraulic brake system;

FIG. 7B is a view showing a condition of a communication condition control device according to the second embodiment of the invention;

FIG. 8 is a view showing a hydraulic brake system including a master cylinder apparatus according to a third embodiment of the invention;

FIG. 9A is a conceptual diagram (a partial sectional view) showing a communication cutoff control device of the hydraulic brake system;

FIG. 9B is a view showing a condition of the communication condition control device;

FIG. 11A is a conceptual diagram (a partial sectional view) showing a communication cutoff control device of the hydraulic brake system;

FIG. 11B is a view showing a condition of the communication condition control device;

FIG. 12 is a view showing a hydraulic brake system including a master cylinder apparatus according to a fifth embodiment of the invention;

DETAILED DESCRIPTION OF EMBODIMENTS

A hydraulic brake system including a master cylinder according to an embodiment of the invention will be described in detail below on the basis of the drawings. The hydraulic brake system includes a master cylinder apparatus according to an embodiment of the invention.

Figure 1:
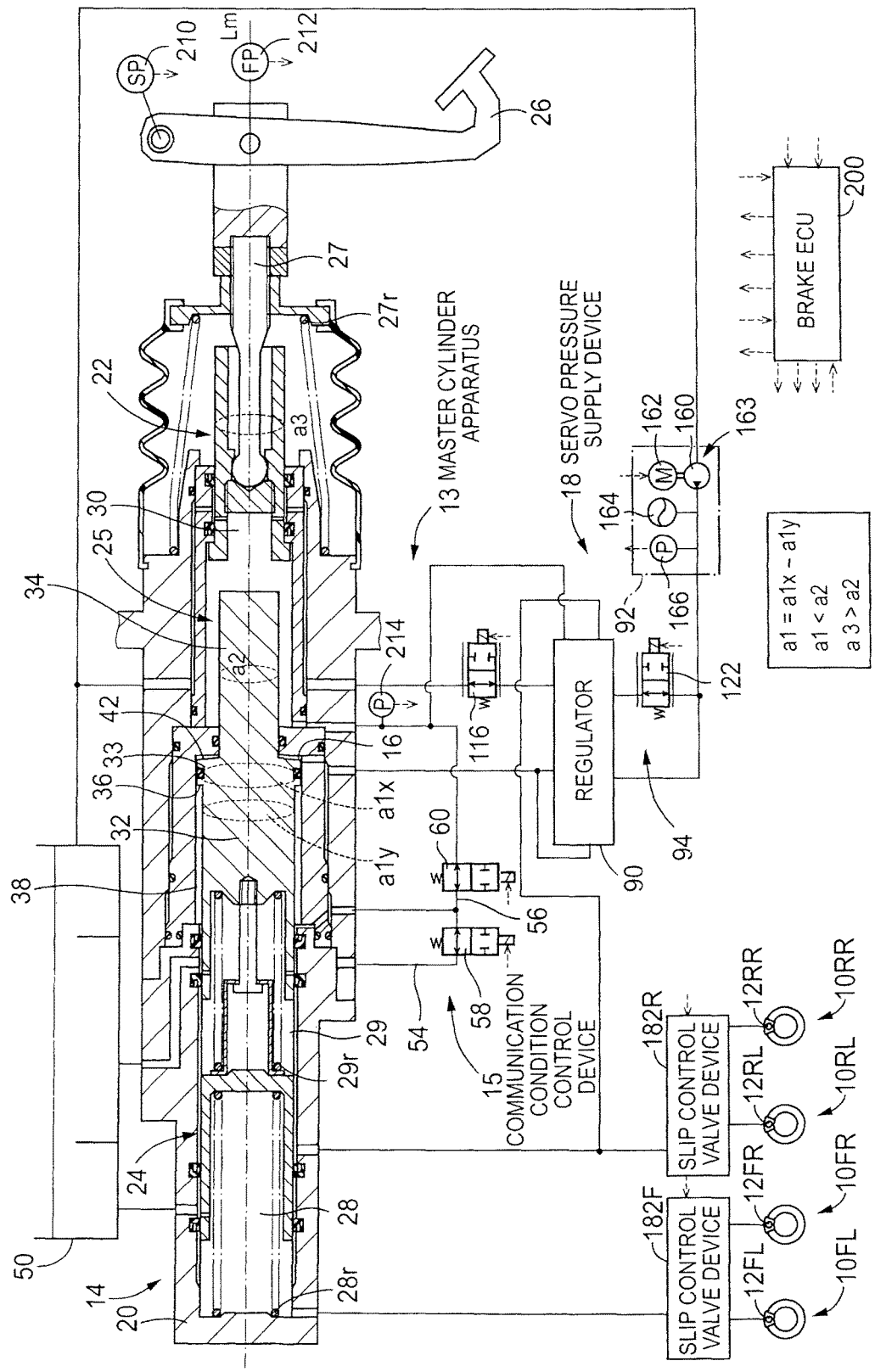
FIG. 1 is a view showing a hydraulic brake system including a master cylinder apparatus according to a first embodiment of the invention.

The hydraulic brake system is provided in a vehicle. FIG. 1 shows an example of the hydraulic brake system according to the invention. The hydraulic brake system includes (i) brake cylinders 12FL, 12FR, 12RL, 12RR of hydraulic brakes that are provided respectively on front, rear, left, and right wheels 10FL, 10FR, 10RL, 10RR and operated by fluid pressure to suppress rotation of the respective wheels, (ii) a master cylinder apparatus 13, and so on. The master cylinder apparatus 13 includes (a) a master cylinder 14 that supplies fluid pressure to the brake cylinders 12FL, 12FR, 12RL, 12RR, (b) a communication condition control device 15 that controls communication conditions between a reservoir and an opposing chamber and an inter-piston chamber of the master cylinder 14, to be described below, (c) a servo pressure supply device 18 serving as a back surface fluid pressure control device that supplies regulatory fluid pressure (also referred to as servo pressure hereafter) to a back surface chamber 16 of the master cylinder 14, and so on. Note that the communication condition control device 15 may be provided separately to the master cylinder 14 or as part of the constituent elements of the master cylinder 14.

The master cylinder 14 includes (1) a housing 20, and (2) an input piston 22 and two pressure pistons 24, 25 fitted to the housing 20 to be fluid-tight and capable of sliding. The input piston 22 and the two pressure pistons 24, 25 are disposed on an identical axis (Lm) to be capable of moving relative to each other. A brake pedal 26 serving as a brake operating member is linked to the input piston 22 via an operation rod 27 to be capable of advancing in response to a depression operation of the brake pedal 26. Further, a return spring 27r is provided between a member capable of moving integrally with the input piston 22 and the housing 20. Pressure chambers 28, 29 are formed respectively in front of the pressure pistons 24, 25. The brake cylinders 12FL, 12FR of the left and right front wheels 10FL, 10FR are connected to the pressure chamber 28, and the brake cylinders 12RL, 12RR of the left and right rear wheels 10RL, 10RR are connected to the pressure chamber 29. Furthermore, return springs 29r, 28r are provided respectively between the pressure pistons 24, 25 and between the pressure piston 24 and the housing 20. An inter-piston chamber 30 is provided between the pressure piston 25 and the input piston 22 to the rear thereof. Hence, in the hydraulic brake system according to this embodiment, the master cylinder 14 is a tandem type master cylinder having front and rear systems.

In the pressure piston 25, a front portion is constituted by a front small diameter portion 32, an intermediate portion is constituted by an intermediate large diameter portion 33, and a rear portion is constituted by a rear small diameter portion 34 having a smaller diameter than the front small diameter portion 32. The pressure piston 25 is formed in a stepped shape by the front small diameter portion 32 and the intermediate large diameter portion 33. The pressure chamber 29 is provided in front of the front small diameter portion 32. An opposing chamber 38 is formed in front of a step surface 36 between the front small diameter portion 32 and the intermediate large diameter portion 33. The back surface chamber 16 is provided rearward of a step surface 42 serving as a pressure receiving surface between the intermediate large diameter portion 33 and the rear small diameter portion 34. Further, the front small diameter portion 32, the intermediate large diameter portion 33, and the rear small diameter portion 34 are respectively fitted in a fluid-tight fashion to the housing 20. As a result, the opposing chamber 38, the back surface chamber 16, the inter-piston chamber 30, and the pressure chamber 29 are cut off from each other so as to be fluid-tight. In other words, fluid pressure can be generated individually and independently in each of the opposing chamber 38, the back surface chamber 16, the inter-piston chamber 30, and the pressure chamber 29.

In this embodiment, an effective pressure receiving surface area $a1$ (=$a1x$–$a1y$) of the step surface 36 of the pressure piston 25 that opposes the opposing chamber 38 is smaller than an effective pressure receiving surface area $a2$ of a part of the rear small diameter portion 34 positioned in the inter-piston chamber 30 ($a1 < a2$), and the effective pressure receiving surface area $a2$ is smaller than an effective pressure receiving surface area $a3$ of a part of the input piston 22 positioned in the inter-piston chamber 30 ($a3 > a2$). The effective pressure receiving surface area is a surface that substantially receives fluid pressure. More specifically, when a stroke of a piston (here, the pressure piston 25 and the input piston 22) is set as s and volumetric change in a space of a fluid pressure chamber (here, the opposing chamber 38 and the inter-piston chamber 30) housing working fluid is set as q, the effective pressure receiving surface area takes a value (q/s) obtained by dividing the volumetric change q by the set stroke s.

The communication condition control device 15 controls communication conditions between the inter-piston chamber 30, the opposing chamber 38, and a reservoir 50. The communication condition control device 15 includes (i) a reservoir passage 54 connecting the opposing chamber 38 to the reservoir 50, (ii) an inter-chamber connection passage 56 connecting the opposing chamber 38 to the inter-piston chamber 30, (iii) a reservoir connection valve 58 provided in the reservoir passage 54, and (iv) an inter-chamber connection cutoff valve 60 provided in the inter-chamber connection passage 56. The reservoir connection valve 58 and the inter-chamber connection cutoff valve 60 are respectively constituted by normally open solenoid valves that are open when a current is not supplied to respective solenoids thereof.

Figure 2:
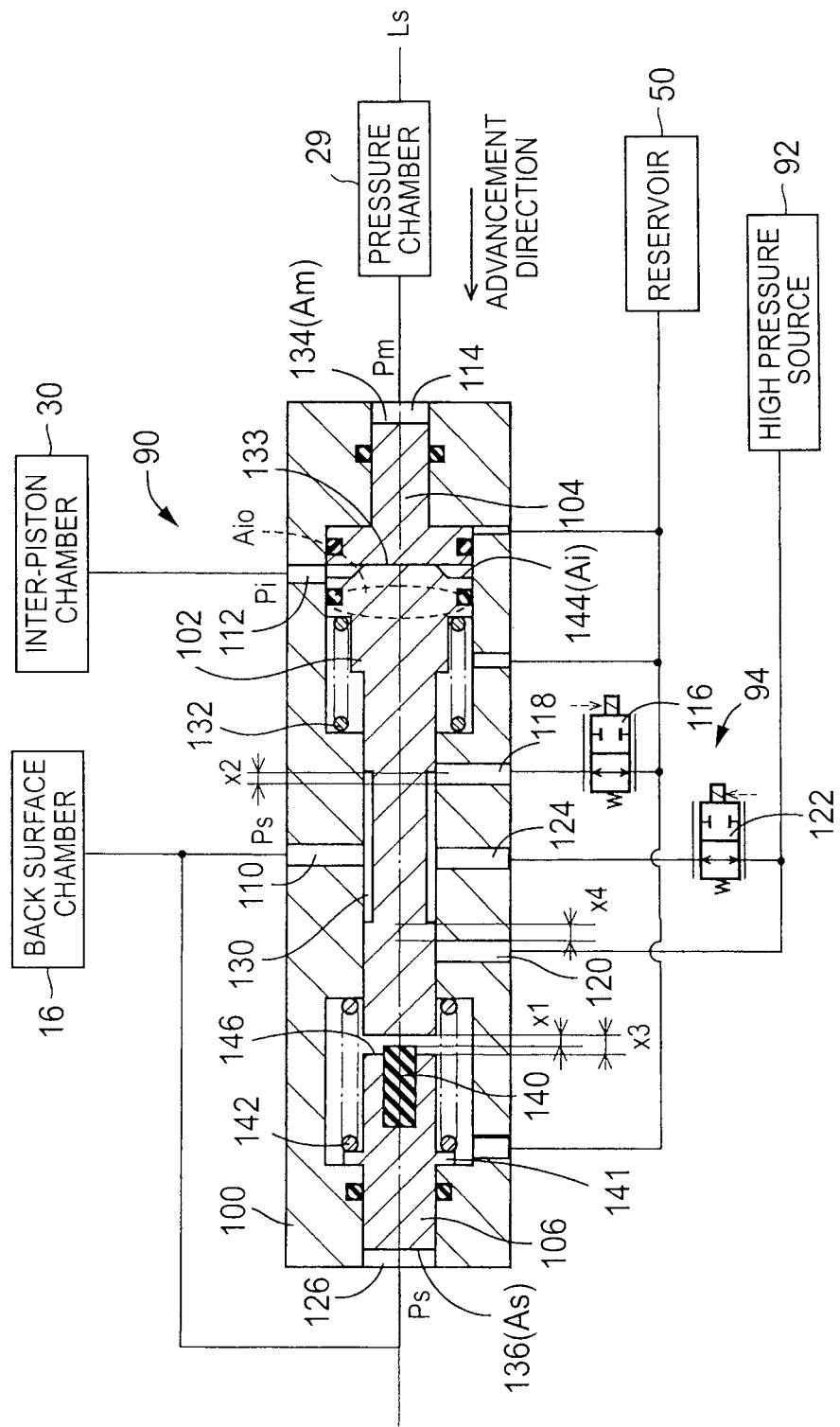
FIG. 2 is a sectional view showing a regulator of a servo pressure supply device included in the master cylinder apparatus.

The servo pressure supply device 18 includes a regulator 90, a high pressure source 92, a linear valve device 94, and so on. As shown in FIG. 2, the regulator 90 is capable of controlling the fluid pressure (servo pressure) supplied to the back surface chamber 16 to a magnitude corresponding to an operating force (also referred to as a brake operating force hereafter) applied to the brake pedal 26 using fluid pressure from the high pressure source 92. The regulator 90 includes a housing 100, a spool 102 fitted to the housing 100 to be capable of sliding, an advancement driving member 104 that applies force to the spool 102 in an advancement direction, and a retreat driving member 106 that applies force to the spool 102 in a retreat direction. The spool 102, the advancement driving member 104, and the retreat driving member 106 are respectively disposed on an identical axis (Ls) to be capable of moving relative to each other. The housing 100 is provided with an output port 110 to which the back surface chamber 16 is connected, an input port 112 to which the inter-piston chamber 30 is connected, a master pressure port 114 to which the pressure chamber 29 is connected, a low pressure port 118 to which the reservoir 50 is connected via a pressure reducing linear valve 116, a high pressure port 120 to which the high pressure source 92 is connected, a linear pressure port 124 to which the high pressure source 92 is connected via a pressure increasing linear valve 122, and a feedback pressure port 126 to which the back surface chamber 16 is connected. These ports are provided in the housing 100 at intervals from each other in a radial direction or a direction of the axis (Ls). An annular communication groove 130 extending in the axis (Ls) direction is formed in an outer peripheral portion of an intermediate portion of the spool 102. The communication groove 130 is formed in a position and a size whereby the output port 110 and the linear pressure port 124 are open normally, the low pressure port 118 opens when the spool 102 is in a retreat end position, and the high pressure port 120 opens when the spool 102 is in an advancement end position. Fluid pressure in the output port 110 is controlled by moving the spool 102 relative to the housing 100 so that either the low pressure port 118 or the high pressure port 120 is connected selectively to the output port 110. A return spring 132 is provided between the spool 102 and the housing 100 to bias the spool 102 in a retreat direction. Further, a rear end surface 133 of the spool 102 receives fluid pressure from the input port 112.

The advancement driving member 104 is disposed to the rear of the spool 102, and fluid pressure from the master pressure port 114 is received by a rear end surface 134 thereof. The advancement driving member 104 can be caused to advance by advancement direction force generated by the fluid pressure of the master pressure port 114, and applies the advancement direction force generated by the master pressure to the spool 102. Further, the advancement driving member 104 has a stepped shape including a small diameter portion and a large diameter portion, and the retreat end position is defined by contact between a step portion formed between the small diameter portion and the large diameter portion and the housing 100. In this condition, a front end surface of the advancement driving member 104 functions as a stopper that determines the retreat end position of the spool 102.

The retreat driving member 106 is disposed in front of the spool 102 via a gap, and fluid pressure in the feedback pressure port 126 is received by a front end surface 136 thereof. An elastic member 140 made of rubber or the like is provided on a rear portion (a main body rear portion) of the retreat driving member 106, and a retainer 141 having a stopper function is provided in an intermediate portion so as to project in the radial direction. The advancement end position is defined by contact between the retainer 141 having a stopper function and the housing 100. Meanwhile, a return spring 142 is provided between the retainer 141 having a stopper function and the housing 100. The return spring 142 biases the retreat driving member 106 in the advancement direction. A set load Fset of the return spring 142 is set at a comparatively large value. The retreat driving member 106 can be caused to retreat by retreat direction force of a magnitude obtained by subtracting an elastic force of the return spring 142 from the fluid pressure of the feedback pressure port 126, and applies the retreat direction force to the spool 102.

The spool 102, the advancement driving member 104, and the retreat driving member 106 are respectively fitted to the housing 100 to be fluid-tight. As a result, the master pressure port 114, the input port 112, and the feedback pressure port 126 are cut off from each other in a fluid-tight manner. Further, a surface area of the rear end surface 133 of the spool 102 is set as Aio, a surface area of a part 144 obtained by subtracting a surface area of a contact portion contacting the advancement driving member 104 from the rear end surface 133 (a surface area of an annular part, or in other words a surface area of a part that receives the fluid pressure of the input port 112 in a condition where the spool 102 contacts the advancement driving member 104) is set as Ai, a surface area of the rear end surface 134 of the advancement driving member 104 is set as Am, and a surface area of the front end surface 136 of the retreat driving member 106 is set as As. Furthermore, in a condition where the spool 102 is in the retreat end position (the spool 102 is located at a rearward end portion of a movable range thereof) and the retreat driving member 106 is in the advancement end position (a rearward end portion of a range in which the retreat driving member 106 can move toward the spool 102), a gap x1 between a rear end surface of the elastic member 140 provided on the retreat driving member 106 and a front end surface of the spool 102 equals or exceeds a distance x2 between a rear end surface of the communication groove 130 and the low pressure port 114 (x1≥x2), and a gap x3 between a main body rear end surface 146 of the retreat driving member 106 and the front end surface of the spool 102 equals or exceeds a distance x4 between a front end surface of the communication groove 130 of the spool 102 and the high pressure port 112 (x3≥x4), wherein the distance x1 is equal to or shorter than the distance x4 (x1≤x4). The distances x1 to x4 are designed so that the spool 102 can move to a pressure increasing position in which the output port 110 communicates with the high pressure part 120 via the communication groove 130 before the front end surface of the spool 102 contacts the main body rear end surface 146 of the retreat driving member 106, and so that in the pressure increasing position, the spool 102 contacts (and, in certain cases, elastically deforms) the elastic member 140.

The high pressure source 92 includes a pump device 163 having a pump 160 and a pump motor 162, an accumulator 164, and an accumulator pressure sensor 166 that detects fluid pressure in the accumulator 164. The pump 160 is a plunger pump, for example. The pump motor 162 is controlled to keep the accumulator pressure within a set range. As described above, the linear valve device 94 includes the pressure increasing linear valve 122 provided between the high pressure source 92 and the linear pressure port 124, and the pressure reducing linear valve 116 provided between the low pressure port 118 and the reservoir 50. Respective front-rear differential pressures of the pressure increasing linear valve 122 and the pressure reducing linear valve 116 can be controlled to magnitudes corresponding to amounts of current supplied to respective solenoids thereof. Further, the pressure increasing linear valve 122 and the pressure reducing linear valve 116 are normally open valves that are open when no current is supplied to the solenoids. The linear valve device 94 is used during an automatic brake operation such that when the brake pedal 26 is operated, the pressure increasing linear valve 122 is kept closed and the pressure reducing linear valve 116 is kept open. Note that the pressure increasing linear valve 122 may be a normally closed valve.

Furthermore, a slip control valve device 182F including at least one solenoid valve is provided between the pressure chamber 28 and the brake cylinders 12FL, 12FR of the left and right front wheels. Moreover, a slip control valve device 182R including at least one solenoid valve is provided between the pressure chamber 29 and the brake cylinders 12RL, 12RR of the left and right rear wheels.

The hydraulic brake system is provided with a brake ECU 200 (see FIG. 1) having a computer as a main body. The brake ECU 200 includes an execution unit, an input/output unit, and a storage unit. The accumulator pressure sensor 166, a stroke sensor 210 that detects an operating stroke of the brake pedal 26, a depression force sensor 212 that detects a depression force as the operating force applied to the brake pedal 26, an input fluid pressure sensor 214 that detects the fluid pressure in the inter-piston chamber 30, and so on are connected to the input/output unit together with the reservoir connection valve 58, the connection cutoff valve 60, the linear valve device 94, the pump motor 162, and so on. A large number of programs and tables, including a solenoid valve control program, are stored in the storage unit of the brake ECU 200.

An operation of this hydraulic brake system will now be described.

[Non-Brake Operation Condition]

When a depression operation has not been performed on the brake pedal 26 (in a non-brake operation condition), the master cylinder 14, the communication condition control device 15, and the regulator 90 are in origin positions shown in the drawing. In the master cylinder 14, the input piston 22 and the pressure pistons 24, 25 are in the retreat end position, whereby the inter-piston chamber 30 and the pressure chambers 28, 29 communicate with the reservoir 50. In the regulator 90, the output port 110 communicates with the low pressure port 118, and the back surface chamber 16 communicates with the reservoir 50.

[Initial Stage of Brake Operation]

When the brake pedal 26 is depressed, the reservoir connection valve 58 and the inter-chamber connection cutoff valve 60 of the communication condition control device 15 are respective set in a closed condition and an open condition, as shown in FIG. 5. In the master cylinder 14, the input piston 22 advances, thereby cutting off the inter-piston chamber 30 from the reservoir 50, and as a result, fluid pressure is generated. The fluid pressure of the inter-piston chamber 30 is supplied to the regulator 90.

Figure 3:
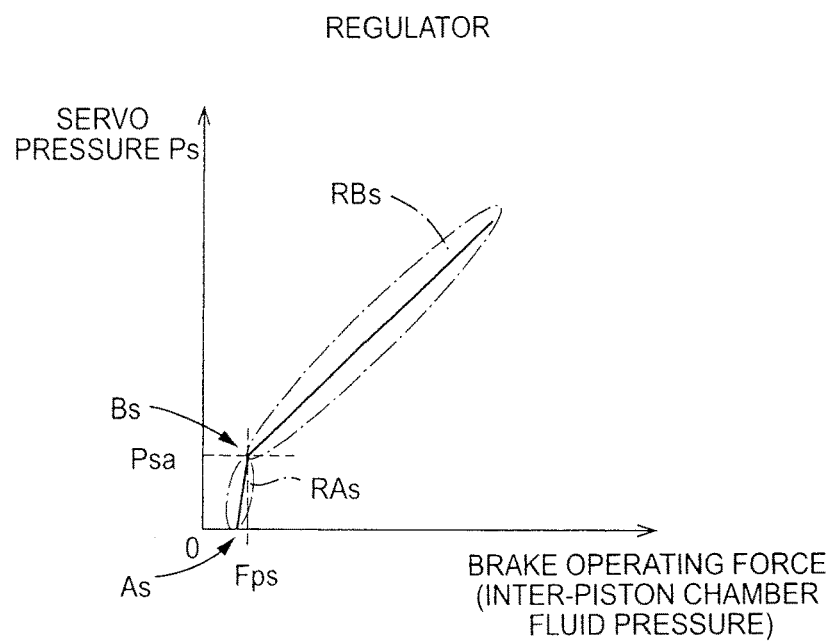
FIG. 3 is a view showing a relationship between a servo pressure of the regulator and a brake operating force.

In the regulator 90, the fluid pressure of the inter-piston chamber 30 is supplied from the input port 112 such that advancement direction force acts on the spool 102. When the advancement direction force exceeds a set load of the return spring 132, the spool 102 advances relative to the advancement driving member 104. The output port 110 is cut off from the low pressure port 118 and connected to the high pressure port 120. As a result, fluid pressure starts to be supplied to the back surface chamber 16 (a point As in FIG. 3). Since the high pressure port 120 communicates with the output port 110, the fluid pressure in the back surface chamber 16 increases on a large gradient in a region RAs in FIG. 3. A position in which the output port 110 and the high pressure port 120 of the spool 102 communicate is available as the pressure increasing position. As described above, x1≥x2, x3≥x4, and x4≥x1 are established, and therefore, when the advancement direction force acting on the spool 102 equals or exceeds a sum (F1+F2) of a force F1 by which the return spring 132 can be elastically deformed by a displacement amount x4 and a force F2 by which the elastic member 140 can be elastically deformed by a displacement amount (x4−x1), the spool 102 is moved to the pressure increasing position {when x4=x1, F2 is zero}. Further, in the pressure increasing position of the spool 102, the spool 102 contacts the elastic member 140. Note that in this embodiment, the set load and a spring constant of the return spring 132 and a set load and a spring constant of the elastic member 140 are set at small values, and therefore the spool 102 is moved to the pressure increasing position when the advancement direction force acting on the spool 102, or in other words the fluid pressure in the inter-piston chamber 30 (corresponding to the brake operating force) is small.

When the spool 102 is in the pressure increasing position, retreat direction force Fb having a magnitude indicated by a following equation is applied to the retreat driving member 106 by a fluid pressure Ps of the back surface chamber 16.

$$Fb = Ps \times As - Pi \times Aio \qquad (1)$$

In the above equation, a fluid pressure Pi is the fluid pressure of the inter-piston chamber 30. The spool 102 contacts the retreat driving member 106, and therefore advancement direction force generated by the fluid pressure in the input port 112 acts on the elastic member 140 (the retreat driving member 106) via the spool 102. When the retreat direction force Fb acting on the retreat driving member 106 exceeds the set load Fset of the return spring 142 (Fb>Fset), the retreat driving member 106 is moved in the retreat direction, and as a result, the spool 102 retreats. The high pressure port 120 is disconnected from the communication groove 130, and the high pressure port 120 is cut off from the output port 110 (a point Bs in FIG. 3). A fluid pressure Psa of the back surface chamber 16 at this point has a magnitude indicated by a following equation.

$$Psa = (Fsets + Pi \times Aio)/As \quad (2)$$

Further, a brake operating force Fps at this point has a magnitude corresponding to the fluid pressure Pi of the inter-piston chamber 30, and can be obtained in advance (hereafter, the operating force Fps will also be referred to as an initial operation completion determination operating force Fpb).

Figure 4:
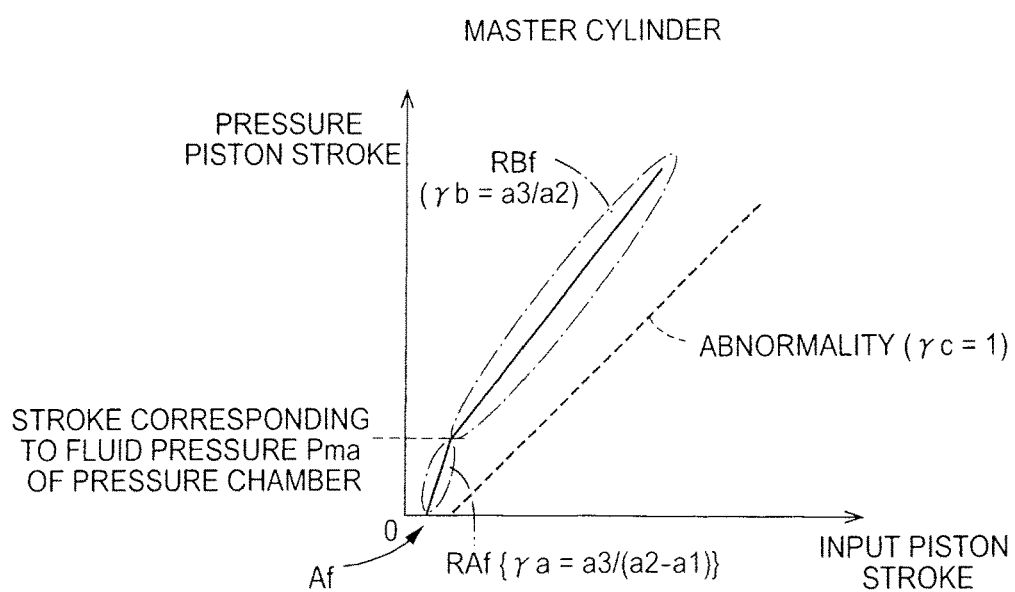
FIG. 4 is a view showing a relationship between respective strokes of an input piston and a pressure piston of a master cylinder included in the master cylinder apparatus.

In the master cylinder 14, when the advancement direction force acting on the pressure piston 25 exceeds a set load of the return spring 29r, the pressure pistons 25, 24 start to advance (a point Af in FIG. 4). When the pressure pistons 25, 24 advance, the pressure chambers 29, 28 are cut off from the reservoir 50, and as a result, fluid pressure is generated. Further, the opposing chamber 38 and the inter-piston chamber 30 are in a communicative condition, and therefore, as the pressure piston 25 advances, working fluid is supplied from the opposing chamber 38 to the inter-piston chamber 30. In this embodiment, the effective pressure receiving surface area a1 of the pressure piston 25 relative to the opposing chamber 38 is smaller than the effective pressure receiving surface area a2 thereof relative to the inter-piston chamber 30 (a1<a2), and therefore advancement of the input piston 22 is permitted even when the working fluid is supplied to the inter-piston chamber 30 from the opposing chamber 38. As shown in FIG. 4, in a region RAf, a ratio γa (=vin/vout) between a stroke velocity yin of the input piston 22 and a stroke velocity vout of the pressure piston 25 takes a magnitude expressed by a following equation.

$$\gamma a = a3/(a2 - a1) \quad (3)$$

This embodiment is designed such that a3>a2>a1 and a difference (a2−a1) is small. The ratio γa therefore takes a large value. Note that both a force corresponding to the fluid pressure in the inter-piston chamber 30 and a force corresponding to the fluid pressure in the back surface chamber 16 are exerted on the pressure pistons 25, 24, and therefore fluid pressure corresponding to the advancement direction force acting on the pressure pistons 25, 24 is generated in the pressure chambers 29, 28. This embodiment is designed such that when the fluid pressure in the back surface chamber 16 reaches the magnitude indicated by Equation (2), the fluid pressure of the pressure chambers 28, 29, or in other words a fluid pressure of the brake cylinder 12, reaches a set pressure Pma that equals or exceeds a fluid pressure at which a first fill is completed.

[Normal Use Region]

In the communication condition control device 15, as shown in FIG. 5, when the brake operating force Fp detected by the depression force sensor 212 reaches the initial operation completion determination operating force Fps, the inter-chamber connection cutoff valve 60 is closed and the reservoir connection valve 58 is opened. Note that a control timing of the communication condition control device 15 may be determined on the basis of the fluid pressure in the inter-piston chamber 30, detected by the input fluid pressure sensor 214, and the operating stroke of the brake pedal 26, detected by the stroke sensor 210, instead of the brake operating force. The fluid pressure Pi of the inter-piston chamber 30, which corresponds to the servo pressure Psa, can be obtained from Equation (2). Further, the operating stroke of the brake pedal 26, which corresponds to the initial operation completion determination operating force Fps, can be obtained in advance.

In the regulator 90, the fluid pressure in the pressure chambers 28, 29 increases, and when a fluid pressure Pm supplied to the master pressure port 114 increases, the advancement driving member 104 advances so as to contact the spool 102. In a condition where the spool 102, the advancement driving member 104, and the retreat driving member 106 (the elastic member 140) contact each other, a force expressed by a following equation acts on the spool 102.

$$Ps \times As - (Ks \times \Delta + Fsets) = Pi \times Ai + Pm \times Am \quad (4)$$

In the above equation, Pm is the fluid pressure of the pressure chamber 29, Ks is a modulus of elasticity of the return spring 142, and Δ is a displacement amount of the return spring 142. According to the above equation, when the retreat direction force on the left side and the advancement direction force on the right side are counterbalanced, the spool 102 moves in the direction of the axis Ls such that the output port 110 communicates selectively with the high pressure port 120 or the low pressure port 118. As a result, an increase gradient of the servo pressure Ps relative to the brake operating force Fp (corresponding to the fluid pressure Pi of the inter-piston chamber 30 and the fluid pressure Pm of the pressure chamber 29) is smaller in a region RBs of FIG. 3 than in the region RAs. In the master cylinder 14, the inter-piston chamber 30 is cut off from the opposing chamber 38 and the reservoir 50, whereas the opposing chamber 38 communicates with the reservoir 50. As indicated by a following equation, a stroke velocity ratio γb (vout/vin) in this case is γb=a3/a2. The ratio γb is greater than 1. Note that since a force corresponding to the fluid pressure in the inter-piston chamber 30 and a force corresponding to the fluid pressure in the back surface chamber 16 act on the pressure pistons 25, 24, the magnitude of the fluid pressure in the pressure chambers 29, 28 is determined by these forces. Meanwhile, the fluid pressure in the back surface chamber 16 has a magnitude corresponding to the brake operating force, and therefore the fluid pressure in the pressure chambers 29, 28 also has a magnitude corresponding to the brake operating force.

[When Abnormality Occurs in Electrical System]

In the communication condition control device 15, as shown in FIG. 5, when the current supply to the solenoids is stopped, the reservoir connection valve 58 and the connection cutoff valve 60 are opened. Accordingly, both the opposing chamber 38 and the inter-piston chamber 30 communicate with the reservoir 50. In the regulator 90, no fluid pressure is generated in the inter-piston chamber 30, and therefore, in the initial stage of the brake operation, the spool 102 is in the position shown in the drawing. When fluid pressure is subsequently generated in the pressure chamber 28 such that the advancement direction force increases, the advancement driving member 104 advances, thereby causing the spool 102 to advance. The output port 110 is cut off from the low pressure port 118 and connected to the high pressure port 120. The fluid pressure of the output port 110 is controlled while fluid pressure remains in the accumulator 164, and therefore the servo pressure Ps can be supplied to the back surface chamber 16. Further, even when fluid pressure can no longer be supplied from the accumulator 164, working fluid can be supplied from the reservoir 50 to the output port 110 via the high pressure port 120 and the linear valve port 124 (the pressure increasing linear valve 122 of which is open) by an action of a check valve (a discharge valve, an intake valve) provided in the plunger pump 160. In the master cylinder 14, when the brake pedal 26 is depressed (caused to perform an advancement operation), the input piston 22 advances so as to contact the pressure piston 25. The input piston 22 and the pressure piston 25 advance integrally, and therefore a stroke velocity ratio γc is 1. Further, by supplying the servo pressure Ps to the back surface chamber 16, the fluid pressure in the pressure chambers 28, 29 can be increased correspondingly.

[Execution of Solenoid Valve Control Program]

Figures 5A, 5B:
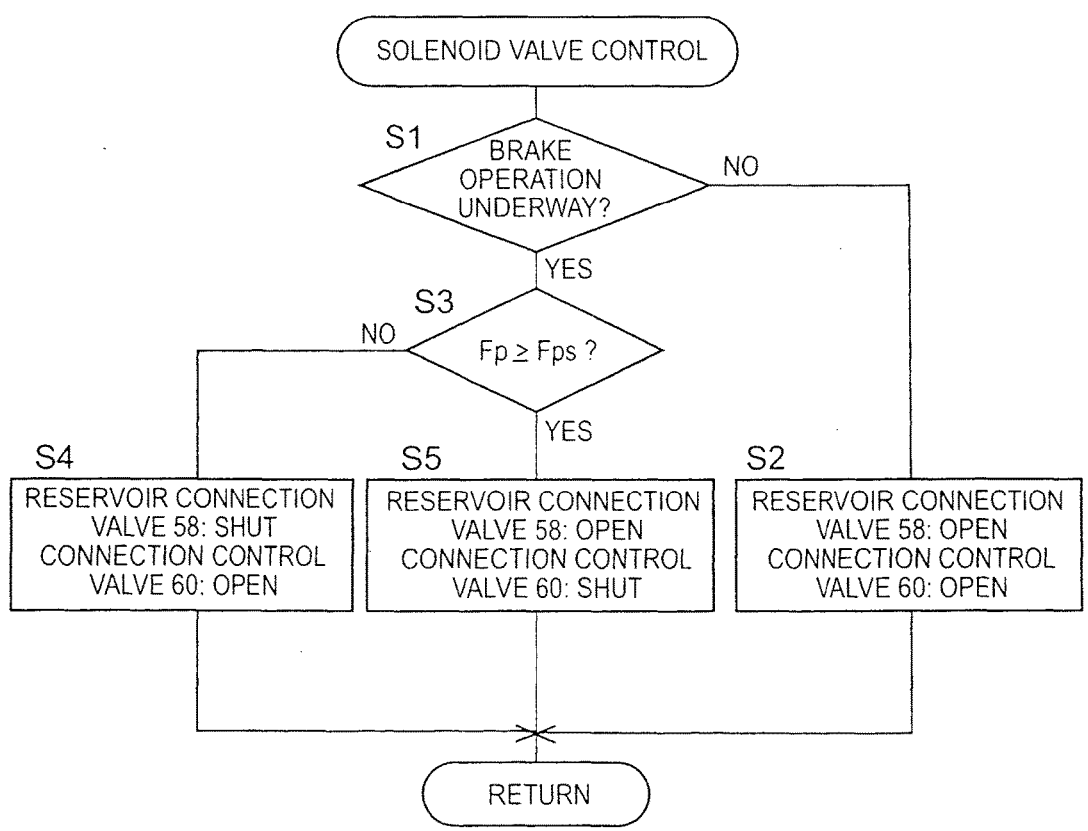
FIG. 5A is a view showing a condition of a communication condition control device included in the master cylinder apparatus.
FIG. 5B is a flowchart illustrating a solenoid valve control program stored in a storage unit of a brake electronic control unit (ECU) included in the hydraulic brake system.

The reservoir connection valve 58 and the inter-chamber connection cutoff valve 60 of the communication condition control device 15 are controlled by executing a solenoid valve control program illustrated on a flowchart shown in FIG. 5B. In step 1 (abbreviated hereafter to S1; likewise for all other steps), a determination is made as to whether or not an operation to depress the brake pedal 26 has been performed. In this embodiment, a depression operation can be detected by determining whether or not a detection value of the stroke sensor 210 equals or exceeds an operation start threshold (a stroke) at which it may be determined that the brake pedal 26 has been depressed; whether or not a detection value of the depression force sensor 212 equals or exceeds an operation start threshold (an operating force) at which it may be determined that the brake pedal 26 has been depressed, and so on. Further, a brake switch may be provided, and the depression operation may be detected on the basis of an ON/OFF condition of the brake switch. When the depression operation of the brake pedal 26 is not detected, a current is not supplied to the solenoids of the reservoir connection valve 58 and the inter-chamber connection cutoff valve 60 in S2. Hence, the reservoir connection valve 58 and the inter-chamber connection cutoff valve 60 are kept open. When the depression operation of the brake pedal 26 is detected, a determination is made in S3 as to whether or not the detection value of the depression force sensor 212 equals or exceeds the initial operation completion determination operating force Fps. When the detection value is smaller than the initial operation completion determination operating force Fps, the reservoir connection valve 58 is closed and the connection cutoff valve 60 is opened in S4. This condition is maintained as long as the brake operating force remains smaller than the initial operation completion determination operating force Fps, and when the brake operating force reaches or exceeds the initial operation completion determination operating force Fps, the reservoir connection valve 58 is opened and the connection cutoff valve 60 is closed in S5. Note that when an abnormality occurs in the electrical system, a current is not supplied to the solenoids, and therefore the reservoir connection valve 58 and the inter-chamber connection cutoff valve 60 remain open. Hence, in this embodiment, the communication conditions between the inter-piston chamber 30, the opposing chamber 38, and the reservoir 50 are controlled by controlling the two solenoid valves 58, 60.

[During Automatic Brake Operation]

When it is necessary to operate an automatic brake, for example during traction control, vehicle stability control, inter-vehicle control, and so on, the linear valve device 94 (the pressure increasing linear valve 122 and the pressure reducing linear valve 116) of the servo pressure supply device 18 is controlled. The fluid pressure controlled by the linear valve device 94 is supplied to the back surface chamber 16 via the output port 110, and as a result, the pressure pistons 25, 24 advance relative to the input piston 22 such that fluid pressure is generated in the pressure chambers 29, 28.

According to this embodiment, therefore, the stroke velocity ratio in the master cylinder 14 while the brake pedal 26 moves from the retreat end position to the advancement end position takes a value larger than 1. As a result, an operating stroke by which a driver operates the brake pedal 26 can be reduced. Further, the stroke velocity ratio can be modified in at least two stages, i.e. the initial stage of the brake operation and the normal use region, and therefore the stroke velocity ratio is greater in the initial stage of the brake operation than in the normal use region. As a result, the operating stroke in the initial stage of the brake operation can be reduced favorably while favorably suppressing an initial response delay. Furthermore, by adjusting the operating stroke in the normal use region, the fluid pressure of the pressure chambers 28, 29 can be regulated easily, leading to an improvement in an operating feeling experienced by the driver. Moreover, when an abnormality occurs in the electrical system, the inter-piston chamber 30 and the opposing chamber 38 can both be connected to the reservoir 50, and in so doing, the stroke velocity ratio can be set at 1. As a result, an increase in the operating stroke of the driver can be suppressed even when an abnormality occurs in the electrical system.

As is evident from the above description, a stroke velocity ratio modification device is constituted by the communication condition control device 15, the pressure piston 25, the input piston 22, parts of the brake ECU 200 for storing and executing the solenoid valve control program, and so on. The communication condition control device 15 also serves as a normal use region velocity ratio reduction unit. Further, a solenoid valve control unit is constituted by the parts of the brake ECU 200 for storing and executing the solenoid valve control program, and so on. Note that there are no limitations on respective structures of the regulator 90 and the servo pressure supply device 18. Moreover, the regulator 90 does not necessarily have to be provided, and the fluid pressure of the back surface chamber 16 may be controlled by control performed by the linear valve device 94. Furthermore, in the first embodiment, the stroke velocity ratio is modified between the initial stage of the brake operation and normal use region, but a modification timing is not limited thereto. For example, the stroke velocity ratio may be modified at a timing where the brake operating force reaches or exceeds a set force at which it may be determined that a large braking force is required.

Figure 6:
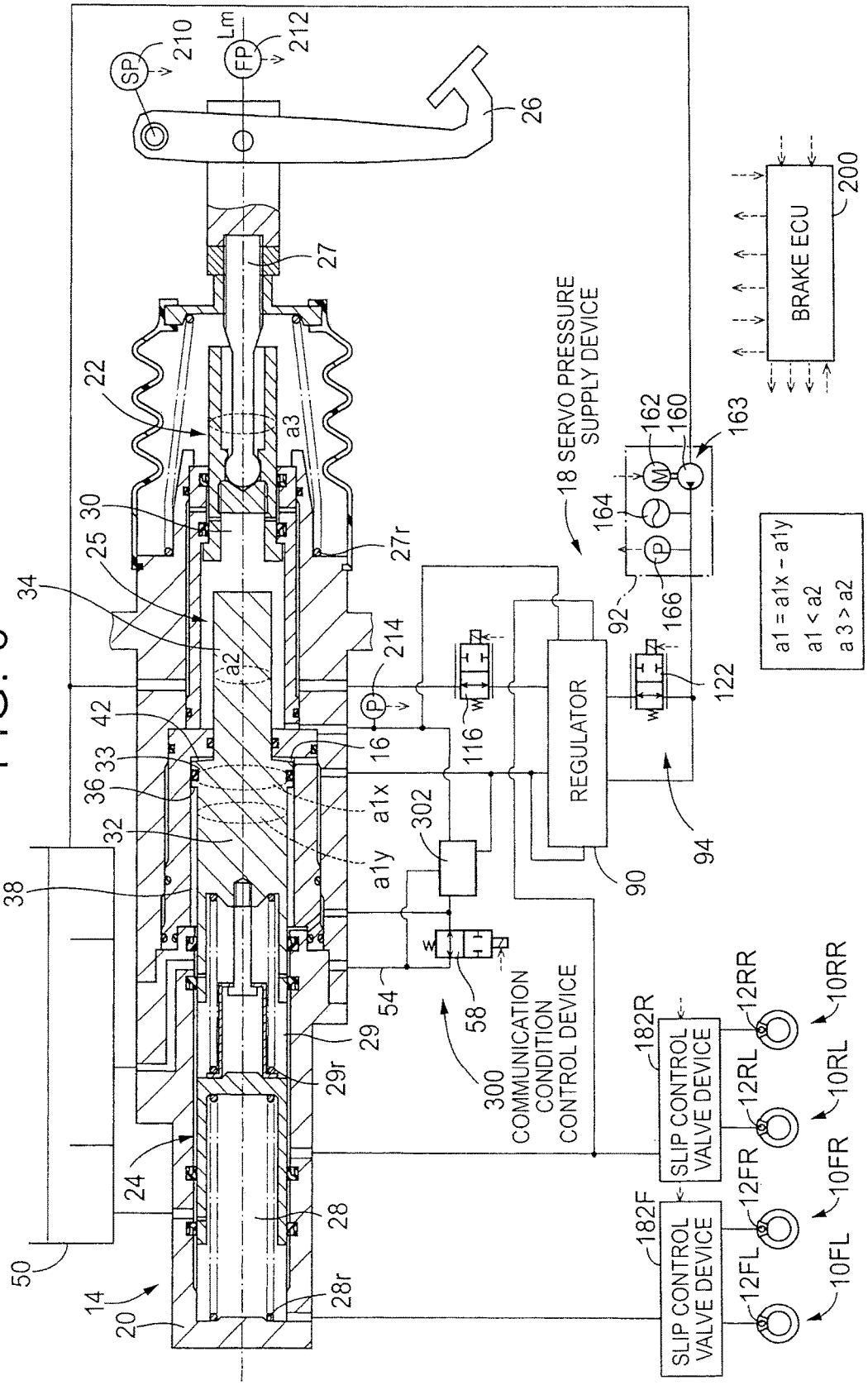
FIG. 6 is a view showing a hydraulic brake system including a master cylinder apparatus according to a second embodiment of the invention.

The structure of the communication condition control device is not limited to the structure described in the above embodiment, and a structure shown in FIGS. 6 and 7, for example, may be employed instead. All other parts are identical to the first embodiment, and therefore description thereof has been omitted. In this embodiment, as shown in FIGS. 6 and 7A, a communication condition control device 300 includes (a) the reservoir connection valve 58, and (b) a connection cutoff mechanism 302 that switches the communication conditions between the inter-piston chamber 30, the opposing chamber 38, and the reservoir 50 mechanically.

The connection cutoff mechanism 302 includes a housing 310, and a movable member 312 provided to be capable of sliding relative to the housing 310 in a direction of an axis Lt. An inter-piston chamber connection port 313 to which the inter-piston chamber 30 is connected, an opposing chamber connection port 314 to which the opposing chamber 38 is connected, a pilot pressure port 316 to which the fluid pressure in the back surface chamber 16 is supplied as pilot pressure, and a reservoir connection port 318 to which the reservoir 50 is connected are provided in the housing 310 at intervals in the axis Lt direction.

The movable member 312 has a stepped shape in which an intermediate large diameter portion 330 having a large diameter is provided in an intermediate portion in the axis (Lt) direction, and a first small diameter portion 332 and a second small diameter portion 334 respectively extending in the axis (Lt) direction are provided on either side of the intermediate large diameter portion 330. The first small diameter portion 332 extends in a T direction in FIG. 7A, while the second small diameter portion 334 extends in a TR direction (an opposite direction to the T direction). A communication chamber 340 is formed on the TR direction side (the second small diameter portion side) of the intermediate large diameter portion 330, and the inter-piston chamber connection port 313 and the opposing chamber connection port 314 are opened on this side. Further, an elastic member (a blocking member) 342 made of rubber or the like is disposed around an opening of the inter-piston chamber connection port 313 formed in the housing 310 to open onto the communication chamber 340. When the second small diameter portion 334 contacts the elastic member 342, the opening of the inter-piston chamber connection port 313 into the communication chamber 340 is blocked such that the inter-piston chamber 30 is cut off from the opposing chamber 38. In this sense, it may be considered that the second small diameter portion 334, the opening of the inter-piston chamber connection port 313 formed in the housing 310, the elastic member 342, and so on together constitute an inter-chamber connection cutoff valve.

A pilot pressure chamber 343 into which the pilot pressure port 316 opens is formed on the opposite side of the intermediate large diameter portion 330 to the communication chamber 340 (i.e. on the T direction side). Further, a step surface 344 between the intermediate large diameter portion 330 and the first small diameter portion 332 of the movable member 312 receives fluid pressure from the pilot pressure chamber 343. Furthermore, a low pressure chamber 346 into which the reservoir connection port 318 opens is formed in a position opposing a T direction end surface 345 of the first small diameter portion 332, and a connection passage 348 capable of connecting the low pressure chamber 346 to the communication chamber 340 (i.e. having openings into both the low pressure chamber 346 and the communication chamber 340) is formed in the movable member 312. Meanwhile, an elastic member (a blocking member) 350 is disposed in a position on the end surface 345 of the first small diameter portion 332 of the housing 310 that opposes an opening of the connection passage 348. When the first small diameter portion 332 is separated from the elastic member 350, the low pressure chamber 346 is connected to the communication chamber 340 by the connection passage 348. When the first small diameter portion 332 contacts the elastic member 350, on the other hand, the connection passage 348 is blocked such that the low pressure chamber 346 is cut off from the communication chamber 340. Hence, it may be considered that the first small diameter portion 332, the connection passage 348, the elastic member 350, and so on together constitute a reservoir cutoff valve. Note that the movable member 312 is fitted to the housing 310 to be fluid-tight by the intermediate large diameter portion 330 and the first small diameter portion 332, and therefore the low pressure chamber 346, the pilot pressure chamber 343, and the communication chamber 340 are cut off from each other in a fluid-tight fashion. Further, a return spring 352 is provided between the intermediate large diameter portion 330 and the housing 310 in order to bias the movable member 312 in the T direction.

As shown in FIG. 7B, in the non-brake operation condition, the reservoir connection valve 58 is open. The movable member 312 is in an origin position (a T direction movement end position) shown in the drawing, and therefore the connection passage 348 is blocked. The communication chamber 340 is cut off from the low pressure chamber 342, while the inter-piston chamber 30 and the opposing chamber 38 communicate via the communication chamber 340. This position of the movable member 312 will be referred to as an inter-chamber connection position. Further, the opposing chamber 38 and the inter-piston chamber 30 communicate with the reservoir 50 via the reservoir connection valve 58.

[Initial Stage of Brake Operation]

When the brake pedal 26 is depressed, the reservoir connection valve 58 is closed. In the connection cutoff mechanism 302, the fluid pressure of the back surface chamber 16 is supplied to the pilot pressure chamber 344 such that TR direction force acts on the movable member 312. As long as the TR direction force is smaller than a set load of the return spring 352, the movable member 312 remains in the inter-chamber connection position shown in the drawing. The opposing chamber 38 and the inter-piston chamber 30 communicate with each other but are cut off from the reservoir 50. This condition corresponds to the region RAf in FIG. 4. In the master cylinder 14, the stroke velocity ratio γa takes a large value.

[Normal Use Region]

When the fluid pressure of the back surface chamber 16 increases such that the TR direction force exerted on the movable member 312 is increased beyond the set load of the return spring 352 by fluid pressure in the pilot pressure chamber 344, the movable member 312 is moved in the TR direction. When the first small diameter portion 332 separates from the elastic member 350 and the second small diameter portion 334 contacts the elastic member 342, the opening of the inter-piston chamber connection port 313 is blocked such that the inter-piston chamber 30 is cut off from the opposing chamber 38. Further, the low pressure chamber 346 communicates with the communication chamber 340 via the connection passage 348. As a result, the opposing chamber 38 communicates with the reservoir 50 via the connection passage 348. This position of the movable member 312 will be referred to as an inter-chamber cutoff position. This condition corresponds to the region RBf in FIG. 4. The stroke velocity ratio in the master cylinder 14 shifts to γb.

[When Abnormality Occurs in Electrical System]

When the current supply to the solenoid is stopped, the reservoir connection valve 58 is opened. Further, when an abnormality occurs in the electrical system, the fluid pressure in the back surface chamber 16 cannot be raised sufficiently. Therefore, the TR direction force exerted on the movable member 312 cannot be increased beyond the set load of the return spring 352 by the fluid pressure in the back surface chamber 16, and as a result, the movable member 312 stays in the inter-chamber connection position. The opposing chamber 38 and the inter-piston chamber 30 communicate with each other, and communicate with the reservoir 50 via the reservoir connection valve 58. Similarly to the first embodiment, the stroke velocity ratio γc in the master cylinder 14 reaches 1.

Hence, according to the communication condition control device 300 according to the second embodiment, in the non-brake operation condition and when an abnormality occurs in the electrical system, the opposing chamber 38 and the inter-piston chamber 30 communicate with the reservoir 50 via the reservoir connection valve 58, while in the normal use region, the opposing chamber 38 communicates with the reservoir 50 via the connection cutoff mechanism 302. During the brake operation, therefore, the opposing chamber 38 and the reservoir 50 can be switched between a communicative condition and a cutoff condition without controlling the solenoid of the reservoir connection valve 58. As a result, when a brake operation is performed while the electrical system is normal, the stroke velocity ratio in the master cylinder 14 can be modified in two stages.

The communication condition control device may also be structured as shown in FIGS. 8 and 9. All other structures are identical to the first embodiment, and therefore description thereof has been omitted. In this embodiment, a communication condition control device 380 includes a connection cutoff mechanism 382, and a flow limitation device 384 provided between the reservoir 50 and the opposing chamber 38. As shown in FIG. 9A, in the connection cutoff mechanism 302 according to the second embodiment, the back surface chamber 16 is connected to the pilot pressure port 316, whereas in the connection cutoff mechanism 382, the pressure chamber 29 is connected to the pilot pressure port 316. The flow limitation device 384 includes (i) a check valve 392 that allows the working fluid to flow from the reservoir 50 into the opposing chamber 38 but prohibits the working fluid from flowing in reverse, and (ii) a relief valve 390 that allows the working fluid to flow from the opposing chamber 38 into the reservoir 50 when the fluid pressure in the opposing chamber 38 exceeds the fluid pressure in the reservoir 50 by at least a set relief pressure, wherein the check valve 392 and the relief valve 390 are provided in parallel. The check valve 390 is provided to prevent negative pressure in the opposing chamber 38, and returns working fluid to the opposing chamber 38 from the reservoir 50 when the operation of the brake pedal 26 is released.

As shown in FIG. 9B, in the non-brake operation condition, the inter-piston chamber 30 and the opposing chamber 38 communicate with each other and are connected to the reservoir 50 via the flow limitation device 384. Hence, the inter-piston chamber 30, the opposing chamber 38, and the reservoir 50 are substantially communicative.

[Initial Stage of Brake Operation]

Even when the brake pedal 26 is depressed, the movable member 312 stays in the inter-chamber communication condition shown in the drawing as long as the fluid pressure in the pressure chamber 29 remains low. Since the opposing chamber 38 and the inter-piston chamber 30 are communicative, the fluid pressure in the opposing chamber 38 is supplied to the inter-piston chamber 30. As a result, the fluid pressure in the opposing chamber 38 does not increase beyond the set relief pressure, and therefore the opposing chamber 38 is substantially cut off from the reservoir 50. This condition corresponds to the region RAf in FIG. 4.

[Normal Use Region]

When the fluid pressure in the pressure chamber 29 increases such that the TR direction force exerted on the movable member 312 increases beyond the set load of the return spring 352, the movable member 312 is moved to the inter-chamber cutoff position. The opposing chamber 38 is cut off from the inter-piston chamber 30, but communicates with the reservoir 50 via the connection passage 348. This condition corresponds to the region RBf in FIG. 4.

[When Abnormality Occurs in Electrical System]

Even when an abnormality occurs in the electrical system, fluid pressure is generated in the pressure chambers 28, 29 of the master cylinder 14 by a manual operation. As long as the fluid pressure in the pressure chamber 29 remains low, the movable member 312 stays in the inter-chamber connection position, but when the fluid pressure in the pressure chamber 29 increases as a result of the manual operation, the fluid pressure in the pilot pressure chamber 343 increases. When the TR direction force exerted on the movable member 312 increases beyond the set load (a set value) of the return spring 352, the movable member 312 is moved to the inter-chamber cutoff position, and as a result, the inter-piston chamber 30 is cut off from the opposing chamber 38. The opposing chamber 38 communicates with the reservoir 50 via the connection passage 348. Since the inter-piston chamber 30 is closed, the stroke velocity ratio γc reaches (a3/a2), which is larger than the values thereof in the first and second embodiments.

Hence, in this embodiment, it is possible during the brake operation to switch between a condition in which the opposing chamber 38 and the inter-piston chamber 30 communicate with each other but are cut off from the reservoir 50 and a condition in which the opposing chamber 38 communicates with the reservoir 50 while the inter-piston chamber 30 is cut off from both the reservoir 50 and the opposing chamber 38 even though the communication condition control device 380 does not include a solenoid valve. Further, when an abnormality occurs in the electrical system, the inter-piston chamber 30 is cut off, and therefore the stroke velocity ratio can be set at a value larger than 1, enabling a reduction in the operating stroke of the brake pedal 26. Note that the check valve 392 does not necessarily have to be provided, and a cap seal provided between the reservoir port of the master cylinder 14 and the opposing chamber 38 may be used instead. An example of this will be described as a fourth embodiment.

Figure 10:
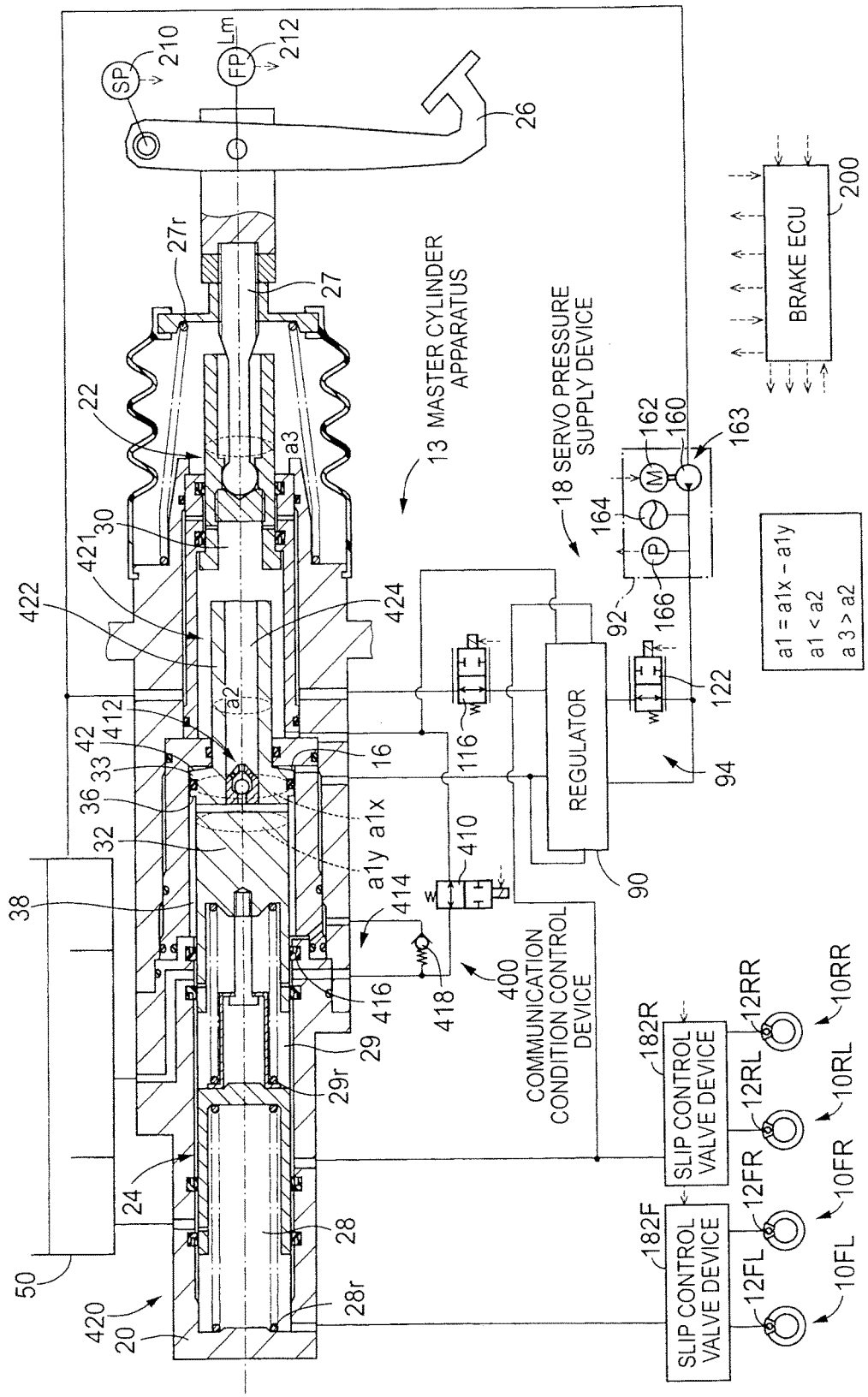
FIG. 10 is a view showing a hydraulic brake system including a master cylinder apparatus according to a fourth embodiment of the invention.

The communication condition control device may also be structured as shown in FIG. 10. As shown conceptually in FIG. 11A, a communication condition control device 400 includes (i) a reservoir connection valve 410 constituted by a solenoid valve provided between the inter-piston chamber 30 and the reservoir 50, (ii) a connection valve 412 that is provided between the inter-piston chamber 30 and the opposing chamber 38, and is switched to an open condition when the fluid pressure in the opposing chamber 38 is higher, thereby permitting a bidirectional flow, and switched to a closed condition when the fluid pressure in the inter-piston chamber 30 is higher, and (iii) a flow limitation device 414 provided between the opposing chamber 38 and the reservoir 50. The flow limitation device 414 includes (a) a check valve 416 that allows the working fluid to flow from the reservoir 50 into the opposing chamber 38 but prohibits the working fluid from flowing in reverse, and (b) a relief valve 418 that allows the working fluid to flow from the opposing chamber 38 into the reservoir 50 when the fluid pressure in the opposing chamber 38 exceeds the fluid pressure in the reservoir 50 by at least a set relief pressure, wherein the check valve 416 and the relief valve 418 are provided in parallel. The reservoir connection valve 410 is a normally open valve that is open when no current is supplied to the solenoid thereof. Further, as shown in FIG. 10, in this embodiment, the connection valve 412 and the check valve 416 are provided in an interior of a master cylinder 420. The check valve 416 serves as a cap seal provided between the reservoir 50 and the opposing chamber 38, while the connection valve 412 is provided in a connection passage 424 formed in a rear small diameter portion 422 of a pressure piston 421 to connect the inter-piston chamber 30 and the opposing chamber 38. All other parts are identical to the first embodiment, and therefore description thereof has been omitted.

As shown in FIG. 11B, in the non-brake operation condition, the reservoir connection valve 410 is open, and therefore the inter-piston chamber 30 communicates with the reservoir 50. Further, the opposing chamber 38 communicates with the reservoir 50 either via the check valve 416 or via the connection valve 412, the inter-piston chamber 30, and the reservoir connection valve 410, and therefore the opposing chamber 38 and the reservoir 50 are substantially communicative.

[Initial Stage of Brake Operation]

When the brake pedal 26 is depressed, the reservoir connection valve 410 is closed, and therefore the inter-piston chamber 30 is cut off from the reservoir 50. Meanwhile, the fluid pressure in the back surface chamber 16 increases, causing the advancement direction force exerted on the pressure piston 25 to increase, and when the fluid pressure in the opposing chamber 38 increases, the working fluid is permitted to flow from the opposing chamber 38 into the inter-piston chamber 30 through the connection valve 412. Accordingly, advancement of the pressure piston 25 is permitted. The fluid pressure in the opposing chamber 38 does not increase beyond the set relief pressure, and therefore the opposing chamber 38 is substantially cut off from the reservoir 50. This condition corresponds to the region RAf in FIG. 4.

[Normal Use Region]

When the fluid pressure in the back surface chamber 16 increases such that the fluid pressure in the opposing chamber 38 rises beyond the set relief pressure, the working fluid flows from the opposing chamber 38 into the reservoir 50 through the relief valve 418. When the fluid pressure in the inter-piston chamber 30 increases beyond the fluid pressure in the opposing chamber 38, the connection valve 412 is closed, and therefore the inter-piston chamber 30 is cut off from both the opposing chamber 38 and the reservoir 50. This condition corresponds to the region RBf in FIG. 4.

[When Abnormality Occurs in Electrical System]

When the current supply to the solenoid is stopped, the reservoir connection valve 410 is opened. Hence, the inter-piston chamber 30 and the opposing chamber 38 both communicate with the reservoir 50. As a result, the input piston 22 and the pressure piston 25 are moved integrally such that the stroke velocity ratio γc reaches 1.

In this embodiment, therefore, the stroke velocity ratio can be switched in two stages in the master cylinder 420 using a simple structure without a connection cutoff mechanism.

Figure 13A:
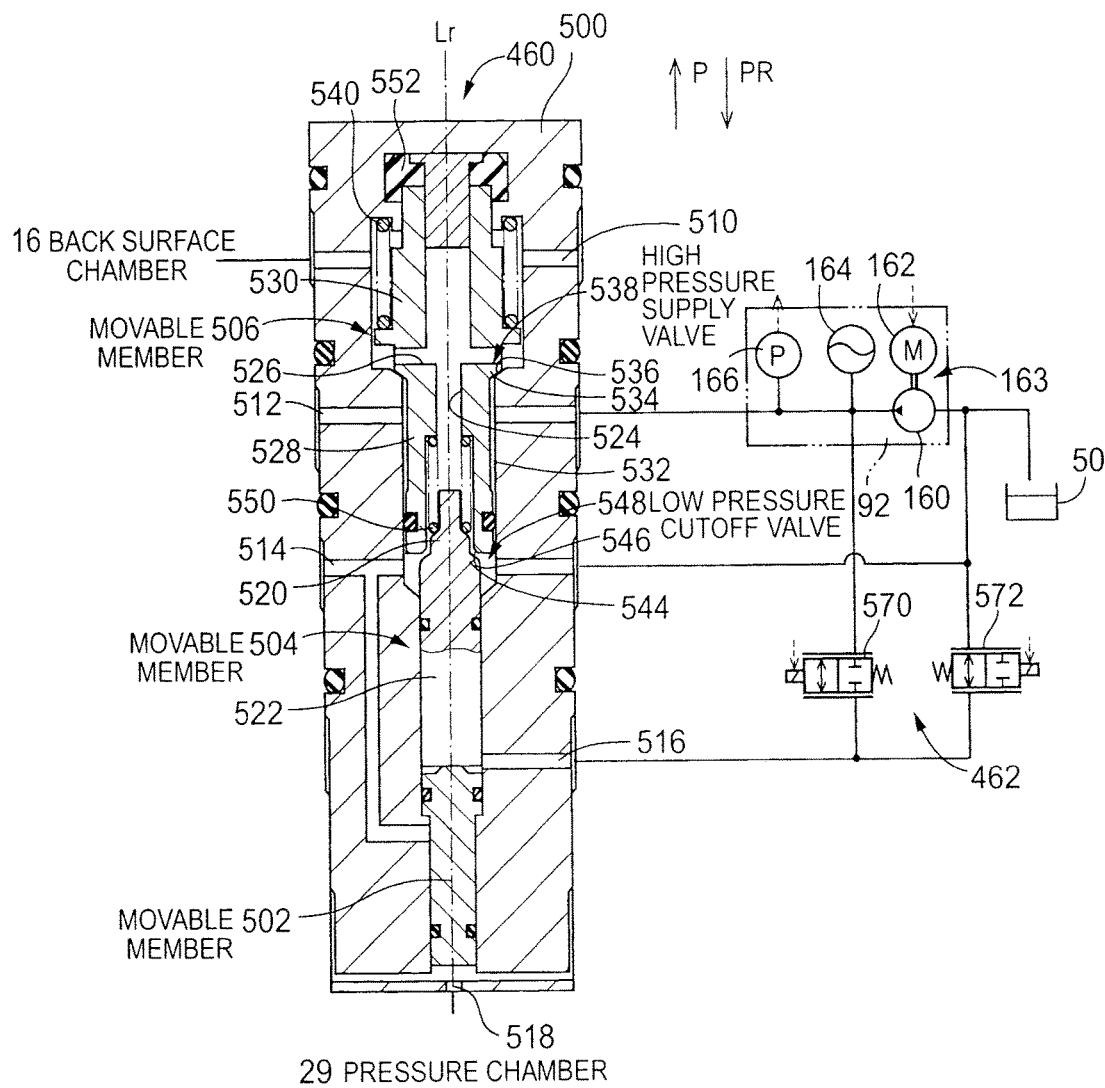
FIG. 13A is a view (a partial sectional view) showing a servo pressure supply device included in the master cylinder apparatus.

The structure of the servo pressure supply device is not limited to that of the embodiments described above, and a structure shown in FIGS. 12 and 13 may be employed instead. All other parts are identical to the first embodiment, and therefore description thereof has been omitted. As shown in FIGS. 12 and 13A, a servo pressure supply device 450 includes a regulator 460, the high pressure source 92, a linear valve device 462, a servo fluid pressure sensor 464 that detects the fluid pressure in the back surface chamber 16, and so on. The regulator 460 is provided between the back surface chamber 16, the high pressure source 92, the linear valve device 462, and the reservoir 50, and in the regulator 460, the servo pressure supplied to the back surface chamber 16 is controlled by control performed by the linear valve device 462 using the fluid pressure of the high pressure source 92. The regulator 460 includes a housing 500, and a plurality of movable members 502 to 506 fitted to the housing 500 in series so as to be fluid-tight and capable of sliding. An output port 510 connected to the back surface chamber 16, a high pressure port 512 connected to the high pressure source 92, a low pressure port 514 connected to the reservoir 50, a linear pressure port 516 connected to the linear valve device 462, and a pilot pressure port 518 connected to the pressure chamber 29 are provided in the housing 500 at intervals in a direction of an axis (Lr).

The movable member 502 can be moved by the fluid pressure of the pilot pressure port 518. A movable member 504 has a stepped shape including a small diameter portion 520 and a large diameter portion 522, wherein a large diameter portion side end surface serves as a pressure receiving surface for receiving fluid pressure from the linear pressure port 516, or in other words fluid pressure controlled by the linear valve device 462. Thus, the movable member 504 can be moved by the fluid pressure controlled by the linear valve device 462. An axial direction passage 524 and an output passage 526 serving as a radial direction passage are formed in a mutually communicative condition in the movable member 506. The output passage 526 communicates with the output port 510. Further, the movable member 506 has a stepped shape including a small diameter portion 528 and a large diameter portion 530, wherein an annular groove portion 532 provided in an outer peripheral surface of the small diameter portion 528 to extend in a parallel direction to the axis Lr communicates with the high pressure port 512. A step portion (a valve element) 534 between the small diameter portion 528 and the large diameter portion 530 and a step portion (a valve seat) 536 provided in the housing 500 together constitute a high pressure supply valve 538. By opening and closing the high pressure supply valve 538, the annular groove portion 532 is connected to and cut off from the output port 510. The high pressure supply valve 538 is biased to a closed condition by a spring 540 provided between the movable member 506 and the housing 500. Further, the small diameter portion 520 of the movable member 504 is positioned inside the axial direction passage 524 of the movable member 506, whereby a step portion (a valve element) 544 between the small diameter portion 520 and the large diameter portion 522 of the movable member 504 and an opening edge portion (a valve seat) 546 of the axial direction passage 524 of the movable member 506 together constitute a low pressure cutoff valve 548. By opening and closing the low pressure cutoff valve 548, the low pressure port 514 is connected to and cut off from the output port 510. The low pressure cutoff valve 548 is biased to an open condition by a spring 550 provided between the movable member 504 and the movable member 506. An elastic member (a member formed from rubber, for example) 552 is provided between an end portion of the movable member 506 on an opposite side to the movable member 504 and the housing 500. When the elastic member 552 undergoes elastic deformation, the movable member 506 is permitted to move in a direction of an arrow P (movement in a direction for switching the high pressure supply valve 538 to an open condition).

The linear valve device 462 includes a pressure increasing linear valve 570 provided between the high pressure source 92 and the linear pressure port 516, and a pressure reducing linear valve 572 provided between the linear pressure port 516 and the reservoir 50. Respective front-rear differential pressures of the pressure increasing linear valve 570 and the pressure reducing linear valve 572 can be controlled to magnitudes corresponding to amounts of current supplied to respective solenoids thereof. Further, the pressure increasing linear valve 570 is a normally closed valve that is closed when no current is supplied to the solenoid thereof, while the pressure reducing linear valve 572 is a normally open valve that is open when no current is supplied to the solenoid thereof. By controlling the pressure increasing linear valve 570 and the pressure reducing linear valve 572, the fluid pressure of the linear pressure port 516 is controlled to a desired magnitude. Furthermore, the fluid pressure in the pressure chamber 29 is supplied to the pilot pressure port 518.

Figure 13B:
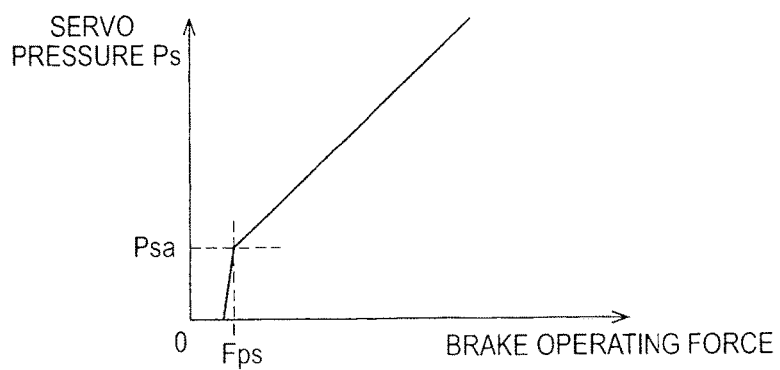
FIG. 13B is a view showing a relationship between a target value of a servo pressure of the servo pressure supply device and the brake operating force.

In the servo pressure supply device 450, the currents supplied to the solenoids of the linear valve device 462 are controlled such that the servo pressure, or in other words the fluid pressure actually output from the output port 510, which is detected by the servo pressure sensor 464, approaches a target fluid pressure. By controlling the fluid pressure of the linear pressure port 516, the high pressure supply valve 538 and the low pressure cutoff valve 548 are opened and closed, and as a result, the servo pressure approaches the target fluid pressure. In this embodiment, as shown in FIG. 13B, the target fluid pressure of the servo pressure is determined such that in the initial stage of the brake operation, a gain takes a large value relative to the brake operating force, whereas in the normal use region, the gain takes a small value relative to the brake operating force. An increase gradient of the fluid pressure actually output from the output port 510 is therefore large in the initial stage of the brake operation and smaller in the normal use region.

Note that in the regulator 460, the inter-piston chamber 30 may be connected to the pilot pressure port 518. Either the fluid pressure of the pressure chamber 29 or the fluid pressure of the inter-piston chamber 30 may be used as the pilot pressure, and in both cases, fluid pressure corresponding to the brake operating force can be used.

Figure 14:
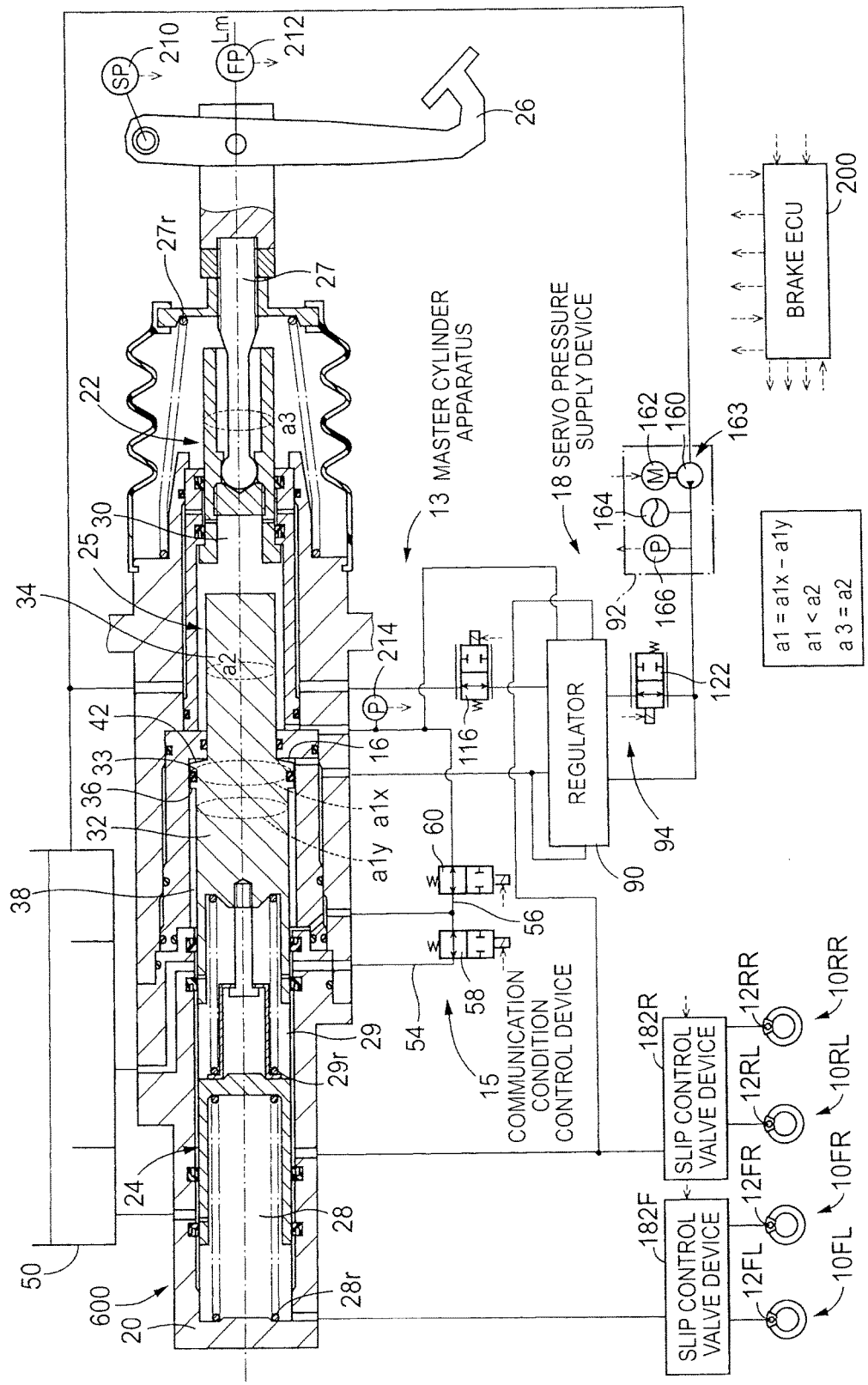
FIG. 14 is a view showing the hydraulic brake system including the master cylinder apparatus according to the fifth embodiment of the invention.
Figure 15:
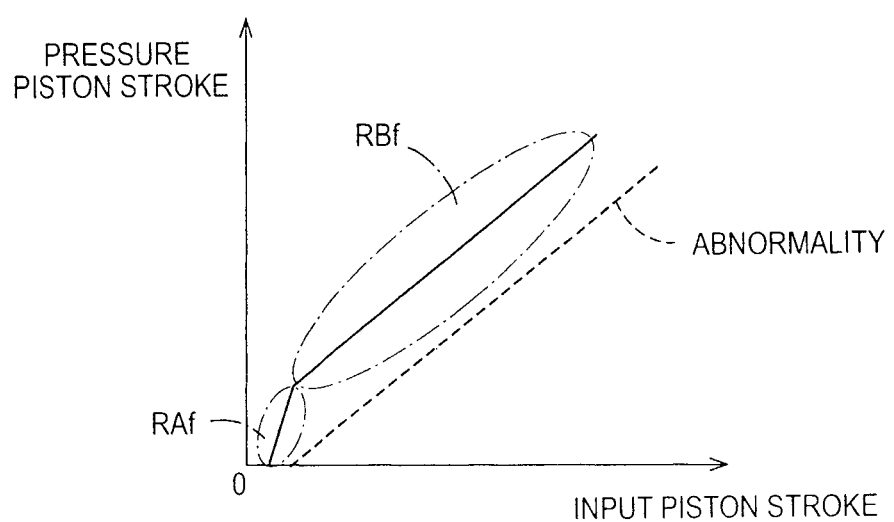
FIG. 15 is a view showing a relationship between respective strokes of an input piston and a pressure piston of the master cylinder apparatus.

In this embodiment, as shown in FIG. 14, in a master cylinder 600, the effective pressure receiving surface area a2 of the pressure piston 25 relative to the inter-piston chamber 30 and the effective pressure receiving surface area a3 of the input piston 22 are substantially identical (a2=a3). Therefore, as shown in FIG. 15, the stroke velocity ratio in the region RAf is smaller than that of the first embodiment, while the stroke velocity ratio in the region RBf is 1. By modifying the respective magnitudes of the effective pressure receiving surface areas of the pressure piston 25 and the input piston 22 relative to the inter-piston chamber 30 in this manner, the stroke velocity ratio can be modified appropriately.

Figure 16:
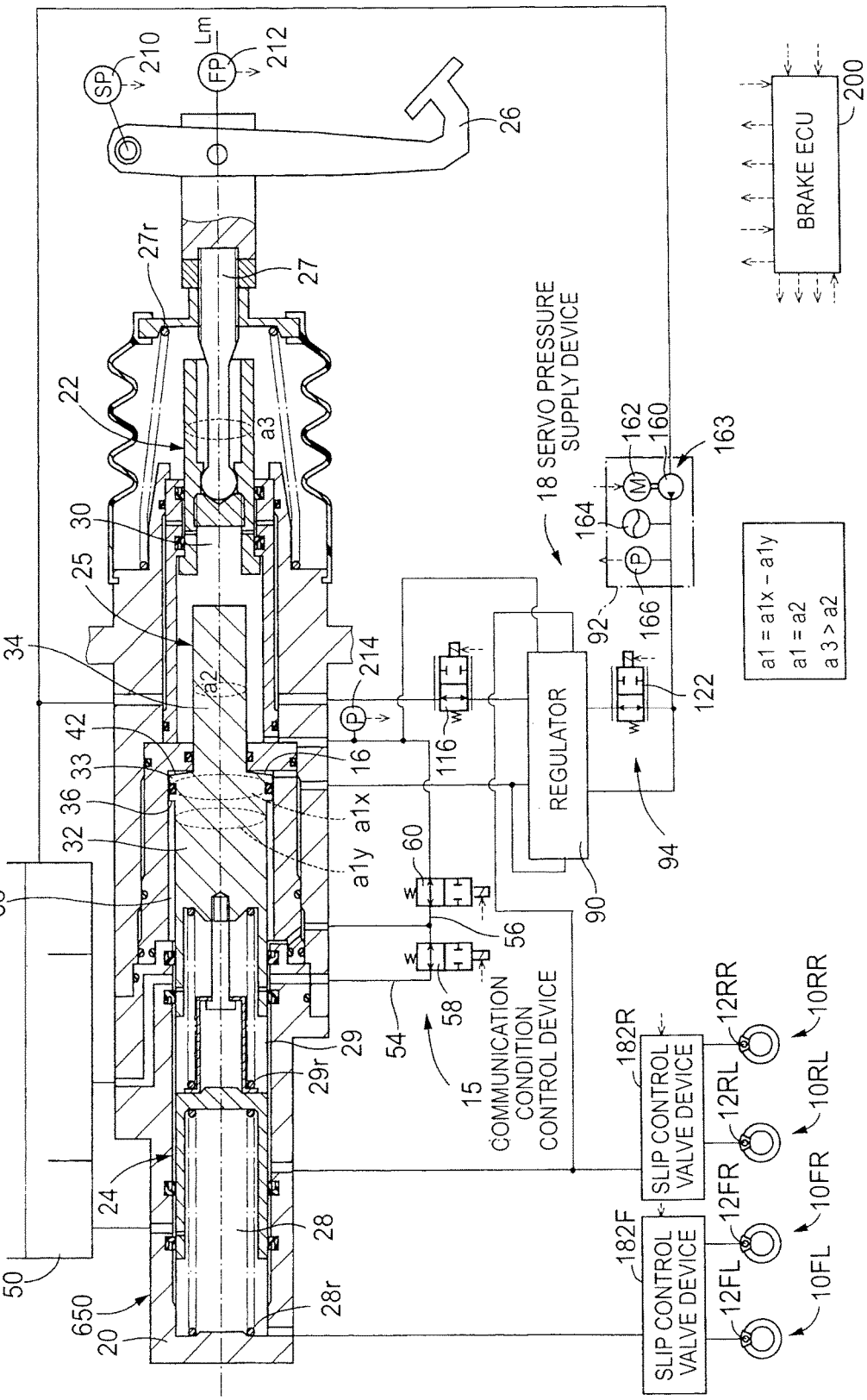
FIG. 16 is a view showing a hydraulic brake system including a master cylinder apparatus according to a sixth embodiment of the invention.
Figure 17:
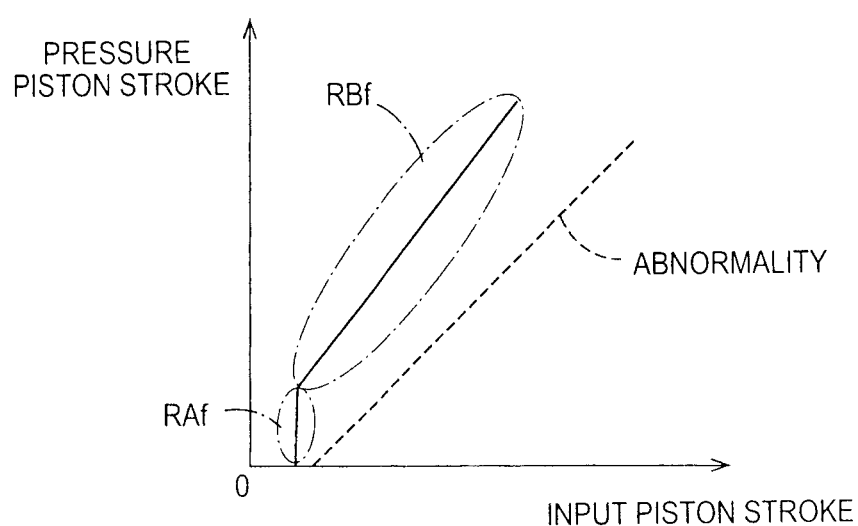
FIG. 17 is a view showing a relationship between respective strokes of an input piston and a pressure piston of the master cylinder apparatus.

In this embodiment, as shown in FIG. 16, in a master cylinder 650, the surface area of the step surface 36 of the pressure piston 25, or in other words the effective pressure receiving surface area a1 of the part opposing the opposing chamber 38, and the effective pressure receiving surface area a2 of the part opposing the inter-piston chamber 30 are substantially identical (a1≅a2). Therefore, as shown in FIG. 17, in the initial stage of the brake operation, the working fluid is supplied from the opposing chamber 38 to the inter-piston chamber 30 such that advancement of the input piston 22 is suppressed. As a result, the ratio between the stroke velocity of the input piston 22 and the stroke velocity of the pressure piston 25 becomes extremely large in a region FAf so as to be theoretically infinite. By greatly increasing the stroke velocity ratio in the initial stage of the brake operation in this manner, an initial response delay in the brake can be suppressed even further.

There are no limitations on the structure of the hydraulic brake circuit and so on, and in addition to the embodiments described above, the invention may be implemented in various other modified and amended embodiments on the basis of the knowledge of persons skilled in the art.

A period required for the input piston to move from the retreat end position to the advancement end position may mean "a period of a single continuous operation of the brake operating member". The stroke may be an amount by which the input piston moves from the retreat end position, and the stroke velocity may be an amount of variation in the stroke within a set time. The stroke velocity ratio may be modified in two stages, three or more stages, or continuously.

The master cylinder apparatus may include the back surface chamber formed to the rear of the pressure receiving surface of the pressure piston such that the pressure piston can be caused to advance relative to the input piston by the fluid pressure in the back surface chamber. The pressure receiving surface is often provided rearward of the large diameter portion of the pressure piston.

In the master cylinder apparatus described in item (7), the communication condition control device includes (a) a flow limitation device having (a-i) a relief valve that allows the working fluid to flow from the opposing chamber into the reservoir when the fluid pressure in the opposing chamber exceeds the fluid pressure in the reservoir by a set relief pressure, but prevents the working fluid from flowing in reverse and (a-ii) a check valve that allows the working fluid to flow from the reservoir into the opposing chamber but prevents the working fluid from flowing in reverse, wherein the relief valve and the check valve are provided in parallel between the opposing chamber and the reservoir, (b) a connection valve that is provided between the opposing chamber and the inter-piston chamber, switched to an open condition in which a bidirectional flow is permitted when the fluid pressure in the opposing chamber is higher than the fluid pressure in the inter-piston chamber, and switched to a closed condition when the fluid pressure in the inter-piston chamber is higher than the fluid pressure in the opposing chamber, and (c) a reservoir/inter-piston chamber connection valve constituted by a normally open solenoid valve provided between the inter-piston chamber and the reservoir. When the brake operating member is operated, the reservoir/inter-piston chamber connection valve is closed. (i) When a force generated by the fluid pressure in the back surface chamber acts on the pressure piston, the fluid pressure in the opposing chamber increases. Since the working fluid is allowed to flow from the opposing chamber into the inter-piston chamber, the pressure piston is allowed to advance. Therefore, the opposing chamber and the inter-piston chamber are substantially communicative. Further, when the working fluid flows from the opposing chamber into the inter-piston chamber, the fluid pressure in the opposing chamber does not reach or exceed the set relief pressure. Therefore, the opposing chamber is substantially cut off from the reservoir. Hence, the opposing chamber and the inter-piston chamber are substantially communicative, the inter-piston chamber is cut off from the reservoir, and the opposing chamber is substantially cut off from the reservoir. (ii) When the fluid pressure in the back surface chamber increases further such that the fluid pressure in the opposing chamber increases beyond the set relief pressure, the working fluid flows out of the opposing chamber into the reservoir via the relief valve. As a result, the fluid pressure in the inter-piston chamber increases beyond the fluid pressure in the opposing chamber, whereby the connection valve is switched to the closed condition. Hence, the inter-piston chamber is substantially cut off from the opposing chamber and also cut off from the reservoir, while the opposing chamber and the reservoir are substantially communicative. (iii) When an abnormality occurs in the electrical system, the reservoir/inter-piston chamber connection valve opens, and therefore the inter-piston chamber communicates with the reservoir. Further, the fluid pressure in the opposing chamber increases beyond the fluid pressure in the inter-piston chamber so that the working fluid is permitted to flow from the opposing chamber into the inter-piston chamber via the connection valve, and therefore the opposing chamber and the inter-piston chamber are substantially communicative. Moreover, the opposing chamber substantially communicates with the reservoir via the inter-piston chamber. The check valve supplies working fluid to the opposing chamber when the operation of the brake operating member is released or the like, for example, and therefore, with the check valve, the opposing chamber is favorably prevented from entering negative pressure.

In the master cylinder apparatus including the input piston that is caused to advance by operating the brake operating member, and the pressure piston that is provided coaxially with the input piston to be capable of moving relative to the input piston, the input piston is disposed opposite the pressure piston via the inter-piston chamber, and the pressure piston has a stepped shape including the large diameter portion and the front small diameter portion that has a smaller diameter than the large diameter portion and is provided in front of the large diameter portion. The master cylinder apparatus also includes the communication condition control device having (i) the inter-chamber connection cutoff valve constituted by a normally open solenoid valve provided between the opposing chamber, which is provided in front of a step surface between the large diameter portion and the front small diameter portion, and the inter-piston chamber, (ii) the reservoir connection valve constituted by a normally open solenoid valve provided between the opposing chamber and the reservoir, and (iii) the solenoid valve control unit that controls the communication conditions between the opposing chamber, the inter-piston chamber, and the reservoir by controlling the reservoir connection valve and the inter-chamber connection cutoff valve. Note that the communication condition control device may be provided separately to the master cylinder or as part of the constituent elements of the master cylinder.

The back surface fluid pressure control device may include (i) the housing in which at least the output port connected to the back surface chamber, the high pressure port connected to the high pressure source, and the low pressure port connected to the reservoir are formed, (ii) the spool that is disposed in the housing to be capable of relative movement and can control the fluid pressure output from the output port by connecting the output port selectively to the high pressure port or the low pressure port, and (iii) the regulator having a spool moving device which, when a force that acts on the spool and is determined by the operating condition of the brake operating member reaches or exceeds a predetermined set value while the spool is in a pressure increasing position in which the output port is cut off from the low pressure port and connected to the high pressure port, moves the output port to a non-pressure increasing position in which the output port is cut off from the high pressure port. While the force determined by the operating condition of the brake operating member remains smaller than the set value, or in other words in the initial stage of the brake operation, the spool is in the pressure increasing position, and therefore the fluid pressure in the back surface chamber can be increased on a large gradient.

The invention claimed is:

1. A master cylinder apparatus comprising:
an input piston that is configured to move forward by operating a brake operating member; and
a pressure piston that is provided in front of the input piston configured to move relative to the input piston, wherein
the input piston is disposed opposite the pressure piston via an inter-piston chamber,
the pressure piston includes a large diameter portion, a front small diameter portion that is provided in front of the large diameter portion and has a smaller diameter than the large diameter portion, and a step constituted by the large diameter portion and the front small diameter portion,
the surface constituting the step between the large diameter portion and the front small diameter portion of the pressure piston forms an opposing chamber,
a first effective pressure receiving surface area of the pressure piston relative to the opposing chamber is equal to or smaller than a second effective pressure receiving surface are thereof relative to the inter-piston chamber, and
the master cylinder apparatus is configured to:
modify a stroke velocity ratio, which is a ratio between a stroke velocity of the pressure piston and a stroke velocity of the input piston, in at least two stages while the input piston moves from a rear end portion position to a front end portion position,
set the stroke velocity ratio at 1 when an abnormality occurs in the master cylinder apparatus, and
set the stroke velocity ratio small when a stroke of the input piston is large, compared to the stroke velocity ratio when the stroke of the input piston is small.

2. The master cylinder apparatus according to claim 1, wherein the master cylinder apparatus is further configured to modify the stroke velocity ratio in the at least two stages when the stroke velocity ratio equals or exceeds 1.

3. The master cylinder apparatus according to claim 1, wherein
the master cylinder apparatus further comprising a communication condition control device that is provided between the inter-piston chamber, the opposing chamber, and a reservoir and that is configured to control communication conditions between the inter-piston chamber, the opposing chamber, and the reservoir so as to switch between an inter-chamber connection condition in which the opposing chamber and the inter-piston chamber communicate with each other but are cut off from the reservoir, an inter-chamber cutoff condition in which the opposing chamber is cut off from the inter-piston chamber, the inter-piston chamber is cut off from the reservoir, and the opposing chamber communicates with the reservoir, and a reservoir connection condition in which both the opposing chamber and the inter-piston chamber communicate with the reservoir.

4. The master cylinder apparatus according to claim 3, wherein the communication condition control device comprises:
an inter-chamber connection cutoff valve constituted by a normally open solenoid valve provided between the opposing chamber and the inter-piston chamber;

a reservoir connection valve constituted by a normally open solenoid valve provided between the opposing chamber and the reservoir; and a solenoid valve control unit that controls the communication conditions between the opposing chamber, the inter-piston chamber, and the reservoir by controlling the reservoir connection valve and the inter-chamber connection cutoff valve.

5. The master cylinder apparatus according to claim 3, wherein the communication condition control device comprises:

a connection cutoff mechanism that is provided between the opposing chamber and the inter-piston chamber and reservoir and includes a movable member that is operated by a pilot pressure, a magnitude of which is determined through electric control, and that is configured to move between a communication position in which the opposing chamber and the inter-piston chamber communicate with each other but are cut off from the reservoir, and a cutoff position in which the opposing chamber communicates with the reservoir but the inter-piston chamber is cut off from both the opposing chamber and the reservoir; and a reservoir connection valve constituted by a normally open solenoid valve provided between the opposing chamber and the reservoir.

6. The master cylinder apparatus according to claim 1, further comprising a back surface pressure control device including a power pressure source that is operated by a supply of power and is configured to output a fluid at a predetermined pressure, and a regulator that controls a pressure exerted on a back surface chamber, which is provided rearward of a pressure receiving surface of the pressure piston, to a magnitude corresponding to an operating condition of the brake operating member by using the pressure output by the power pressure source.

7. A master cylinder apparatus comprising:

an input piston that is configured to move forward by operating a brake operating member; and a pressure piston that is provided coaxially with the input piston and configured to move relative to the input piston, and disposed opposite the input piston via an inter-piston chamber, and has a stepped shape including a large diameter portion and a front small diameter portion that has a smaller diameter than the large diameter portion and is provided in front of the large diameter portion; wherein a communication condition control device is provided between an opposing chamber, which is provided in front of a step surface between the large diameter portion and the front small diameter portion, the inter-piston chamber and a reservoir, the communication condition control device being configured to switch communication conditions among the opposing chamber, the inter-piston chamber, and the reservoir between at least a condition in which the opposing chamber and the inter-piston chamber communicate with each other but are cut off from the reservoir, a condition in which the opposing chamber is cut off from the inter-piston chamber, the opposing chamber communicates with the reservoir, and the inter-piston chamber is cut off from the reservoir, and a condition in which both the opposing chamber and the inter-piston chamber communicate with the reservoir.

8. A master cylinder apparatus comprising:

an input piston that is configured to move forward by operating a brake operating member; and a pressure piston that is provided in front of the input piston configured to move relative to the input piston, wherein the input piston is disposed opposite the pressure piston via an inter-piston chamber, the pressure piston includes a large diameter portion, and a front small diameter portion that is provided in front of the large diameter portion and has a smaller diameter than the large diameter portion, a surface area of the large diameter portion of the pressure piston on which pressure is received from a front side is equal to or smaller than a surface area of the pressure piston on which pressure is received from the inter-piston chamber side, and the master cylinder apparatus is configured to:
modify a stroke velocity ratio, which is a ratio between a stroke velocity of the pressure piston and a stroke velocity of the input piston, in at least two stages while the input piston moves from a rear end portion position to a front end portion position, and
set the stroke velocity ratio at 1 when an abnormality occurs in the master cylinder apparatus, and
set the stroke velocity ratio small when a stroke of the input piston is large, compared to the stroke velocity ratio when the stroke of the input piston is small.

9. A master cylinder apparatus comprising:

an input piston that is configured to move forward by operating a brake operating member; and a pressure piston that is provided in front of the input piston configured to move relative to the input piston, wherein the input piston is disposed opposite the pressure piston via an inter-piston chamber, the pressure piston includes a large diameter portion, a front small diameter portion that is provided in front of the large diameter portion and has a smaller diameter than the large diameter portion, and a step constituted by the large diameter portion and the front small diameter portion, the surface constituting the step between the large diameter portion and the front small diameter portion of the pressure piston forms an opposing chamber, the master cylinder apparatus is configured to:
modify a stroke velocity ratio, which is a ratio between a stroke velocity of the pressure piston and a stroke velocity of the input piston, in at least two stages while the input piston moves from a rear end portion position to a front end portion position,
set the stroke velocity ratio at 1 when an abnormality occurs in the master cylinder apparatus, and
set the stroke velocity ratio small when a stroke of the input piston is large, compared to the stroke velocity ratio when the stroke of the input piston is small, and the master cylinder apparatus further comprising a communication condition control device that is provided between the inter-piston chamber, the opposing chamber, and a reservoir and that is configured to control communication conditions between the inter-piston chamber, the opposing chamber, and the reservoir so as to switch between an inter-chamber connection condition in which the opposing chamber and the inter-piston chamber communicate with each other but are cut off from the reservoir, an inter-chamber cutoff condition in which the opposing chamber is cut off from the inter-piston chamber, the inter-piston chamber is cut off from the reservoir, and the opposing chamber communicates with the reservoir, and a reservoir connection condition in which both the opposing chamber and the inter-piston chamber communicate with the reservoir.

10. The master cylinder apparatus according to claim 9, wherein the communication condition control device comprises:
   an inter-chamber connection cutoff valve constituted by a normally open solenoid valve provided between the opposing chamber and the inter-piston chamber;
   a reservoir connection valve constituted by a normally open solenoid valve provided between the opposing chamber and the reservoir; and
   a solenoid valve control unit that controls the communication conditions between the opposing chamber, the inter-piston chamber, and the reservoir by controlling the reservoir connection valve and the inter-chamber connection cutoff valve.

11. The master cylinder apparatus according to claim 9, wherein the communication condition control device comprises:
   a connection cutoff mechanism that is provided between the opposing chamber and the inter-piston chamber and reservoir and includes a movable member that is operated by a pilot pressure, a magnitude of which is determined through electric control, and that is configured to move between a communication position in which the opposing chamber and the inter-piston chamber communicate with each other but are cut off from the reservoir, and a cutoff position in which the opposing chamber communicates with the reservoir but the inter-piston chamber is cut off from both the opposing chamber and the reservoir; and
   a reservoir connection valve constituted by a normally open solenoid valve provided between the opposing chamber and the reservoir.

* * * * *